(12) United States Patent
DiPalma et al.

(10) Patent No.: US 12,248,495 B2
(45) Date of Patent: Mar. 11, 2025

(54) SYSTEMS AND METHODS FOR FLEXIBLE SYNCHRONIZATION

(71) Applicant: MongoDB, Inc., New York, NY (US)

(72) Inventors: Louis DiPalma, Long Island City, NY (US); Ian Ward, Brooklyn, NY (US); Michael Patrick O'Brien, New York, NY (US); Tyler Kaye, New York, NY (US); Sudarshan Muralidhar, Brooklyn, NY (US); Jonathan Reams, New York, NY (US); Alexander Swane Stigsen, Allerød (DK); Kirollos Morkos, Haworth, NJ (US)

(73) Assignee: MongoDB, Inc., New York, NY (US)

( * ) Notice: Subject to any disclaimer, the term of this patent is extended or adjusted under 35 U.S.C. 154(b) by 0 days.

(21) Appl. No.: 18/329,087

(22) Filed: Jun. 5, 2023

(65) Prior Publication Data
US 2023/0315757 A1    Oct. 5, 2023

Related U.S. Application Data

(63) Continuation-in-part of application No. 17/712,711, filed on Apr. 4, 2022, now Pat. No. 11,748,378,
(Continued)

(51) Int. Cl.
*G06F 17/00*       (2019.01)
*G06F 7/00*        (2006.01)
(Continued)

(52) U.S. Cl.
CPC .............. *G06F 16/275* (2019.01); *G06F 7/14* (2013.01)

(58) Field of Classification Search
CPC ................................ G06F 16/275; G06F 7/14
(Continued)

(56) References Cited

U.S. PATENT DOCUMENTS

| 6,122,640 | A  | 9/2000 | Pereira |
| 6,678,882 | B1 | 1/2004 | Hurley  |

(Continued)

OTHER PUBLICATIONS

International Preliminary Report on Patentability dated Nov. 26, 2020, in connection with International Application No. PCT/US2019/032483.

(Continued)

*Primary Examiner* — Pavan Mamillapalli
(74) *Attorney, Agent, or Firm* — Wolf, Greenfield & Sacks, P.C.

(57) ABSTRACT

A method for managing data synchronization for a database having a dynamic schema, the method comprising: generating, at a first client device, a first changeset that is representative of an operation on a data object in a database; transmitting a synchronization request for synchronizing the database with one or more changesets generated by a second client device; receiving a second changeset that is representative of an operation performed by the second client device on the data object, wherein the database is shared between the first client device and the second client device; and merging, at the first client device, the first changeset and the second changeset to update the data object, wherein the merging is performed based on data received from a plurality of the one or more servers operating in parallel to each other.

20 Claims, 20 Drawing Sheets

Related U.S. Application Data which is a continuation of application No. 16/412,264, filed on May 14, 2019, now Pat. No. 11,294,935.

(60) Provisional application No. 63/349,533, filed on Jun. 6, 2022, provisional application No. 62/671,931, filed on May 15, 2018.

(51) Int. Cl.
*G06F 7/14* (2006.01)
*G06F 16/27* (2019.01)

(58) Field of Classification Search
USPC ............................................. 707/611
See application file for complete search history.

(56) References Cited

U.S. PATENT DOCUMENTS

| | | |
|---|---|---|
| 7,603,357 B1 | 10/2009 | Gourdol |
| 8,072,950 B2 | 12/2011 | Fan |
| 8,352,870 B2 | 1/2013 | Bailor |
| 9,251,235 B1 | 2/2016 | Hurst |
| 9,298,792 B2 | 3/2016 | Ylinen |
| 9,448,789 B2 | 9/2016 | Mathur |
| 9,529,731 B1 | 12/2016 | Wallace et al. |
| 9,552,407 B1 | 1/2017 | Hurst |
| 10,956,446 B1 | 3/2021 | Hurst |
| 11,294,935 B2 | 4/2022 | Stigsen |
| 2002/0023113 A1 | 2/2002 | Hsing et al. |
| 2002/0099728 A1 | 7/2002 | Lees et al. |
| 2003/0028683 A1 | 2/2003 | Yorke et al. |
| 2004/0088347 A1* | 5/2004 | Yeager ................. H04L 67/107 709/227 |
| 2004/0088348 A1* | 5/2004 | Yeager ................. H04L 67/104 709/202 |
| 2004/0088369 A1* | 5/2004 | Yeager ................. H04L 67/104 709/217 |
| 2004/0088646 A1* | 5/2004 | Yeager ................. H04L 67/1044 715/255 |
| 2004/0133640 A1* | 7/2004 | Yeager ................. H04L 67/104 709/204 |
| 2004/0148316 A1 | 7/2004 | Bridge, Jr. et al. |
| 2005/0071195 A1 | 3/2005 | Cassel |
| 2005/0090201 A1* | 4/2005 | Lengies ................. H04L 45/00 455/431 |
| 2006/0020570 A1* | 1/2006 | Wu ................. G06F 16/2336 707/E17.007 |
| 2007/0087756 A1* | 4/2007 | Hoffberg ........... G06Q 10/06375 455/450 |
| 2007/0180084 A1* | 8/2007 | Mohanty ............. G06F 11/1464 709/223 |
| 2008/0027996 A1 | 1/2008 | Morris |
| 2008/0189365 A1* | 8/2008 | Narayanaswami ... H04L 67/142 709/204 |
| 2009/0210459 A1 | 8/2009 | Nair |
| 2009/0271696 A1 | 10/2009 | Bailor |
| 2011/0026838 A1* | 2/2011 | King ..................... G06Q 30/00 382/209 |
| 2012/0166400 A1 | 6/2012 | Sinclair et al. |
| 2016/0342335 A1 | 11/2016 | Dey et al. |
| 2017/0075949 A1 | 3/2017 | Stefani et al. |
| 2018/0129697 A1* | 5/2018 | Mullins ............... G06F 16/2365 |
| 2019/0354540 A1 | 11/2019 | Stigsen |
| 2022/0229849 A1 | 7/2022 | Stigsen |

OTHER PUBLICATIONS

International Search Report and Written Opinion dated Jul. 24, 2019, in connection with International Application No. PCT/US2019/032483.

* cited by examiner

SYSTEMS AND METHODS FOR FLEXIBLE SYNCHRONIZATION

RELATED APPLICATIONS

This application claims priority under 35 U.S.C. § 119(e) to U.S. Provisional Application Ser. No. 63/349,533, entitled "SYSTEMS AND METHODS FOR FLEXIBLE SYNCHRONIZATION," filed on Jun. 6, 2022. This application claims priority under 35 U.S.C. § 120 to and is a continuation in part of U.S. patent application Ser. No. 17/712,711, entitled "CONFLICT RESOLUTION IN DISTRIBUTED COMPUTING", filed Apr. 4, 2022, which claims priority under 35 U.S.C. § 120 to and is a continuation of U.S. patent application Ser. No. 16/412,264, entitled "CONFLICT RESOLUTION IN DISTRIBUTED COMPUTING", filed May 14, 2019, which claims priority under 35 U.S.C. § 119(e) to U.S. Provisional Application Ser. No. 62/671,931, entitled "METHOD AND APPARATUS FOR CONFLICT RESOLUTION", filed May 15, 2018, each of which is incorporated by reference in their entirety.

BACKGROUND

One of the defining features of mobile devices is the fact that one can never count on being online. Loss of connectivity is a fact of life, and so are slow networks and choppy connections. However, users still expect their apps to work. This means that there may be two or more users making changes to the same piece of data independently, thus creating conflicts. This can happen even with perfect connectivity because the latency of communicating between the mobile device and the server may be slow enough that two or more mobile devices can end up creating conflicting changes at the same time.

SUMMARY

Some embodiments are directed to resolving conflicts that arise in changes made to data by multiple computing devices. Some embodiments resolve a data conflict through the application of rules to the data manipulation operations performed by the computing devices. In some embodiments, although the data is shared among multiple computing devices, each computing device may have a copy of the shared data. The rules ensure that data at each of the multiple computing devices will eventually be consistent.

In some embodiments, when changes are made to a data object, e.g., by a user associated with a computing device, the computing device generates changesets corresponding to the data manipulation operations. In some embodiments, a changeset contains instructions corresponding to a data manipulation operation performed on a data object. In some embodiments, each of the computing devices can generate their own changesets representing data manipulation operations performed on the data object at the respective computing devices. In some embodiments, the data is synchronized by exchanging these changesets between the computing devices and merging the changesets on each of the computing devices. A conflict can arise when two changesets are merged on a computing device. Some embodiments can resolve the conflict by merging the two changesets based on a set of merging rules. The merging rules are defined as a function of the type of data manipulation operations in each of the two changesets and a timestamp associated with each of the two changesets. For example, if a first changeset, which is generated at a first computing device, represents a delete operation on a data object at the first computing device and a second changeset, which is generated at a second computing device, represents an updating a value of an attribute of the data object at the second computing device, the delete operations emerges as a winner in the conflict and the update operation is discarded as part of the merge operation. The merge operation is executed at both the devices. In another example, if the first changeset represents a "set" operation that sets an attribute of the data object to a first value and the second changeset also represents a "set" operation that sets an attribute of the data object to a second value, the operation that has a later timestamp emerges as a winner in the merge operation.

In some embodiments, each of the computing devices upload their changesets to a server computing device ("server"), which stores changesets in the order they are received. In some embodiments, whenever a computing device synchronizes with the server, the computing device can download the changesets of other computing devices from the server and execute the merge operations on the downloaded changesets.

In some embodiments, the server and/or devices, when online, may receive operations from devices and/or severs and interleave them into a shared understanding of history (e.g., what operations occurred when and upon what data), which will update when new devices/servers connect and unify based on Operational Transformation/Conflict resolution rules.

Some embodiments are directed to at least one computer-readable storage medium having instructions recorded thereon which, when executed by a computer, cause the computer to perform a method for managing data synchronization for a database having a dynamic schema. The method may comprise: generating, at a first client device, a first changeset that is representative of an operation on a data object in a database; transmitting, from the first client device and to one or more servers, a synchronization request for synchronizing the database with one or more changesets generated by a second client device; receiving, at the first client device and from the one or more servers in response to the synchronization request, a second changeset that is representative of an operation performed by the second client device on the data object, wherein the database is shared between the first client device and the second client device; and merging, at the first client device, the first changeset and the second changeset to update the data object, wherein the merging is performed based on data received from a plurality of the one or more servers operating in parallel to each other.

In some embodiments, permissions to access the database are controlled at a document level. In some embodiments, the permissions are controlled at a field level. In some embodiments, permissions to access the database change across sessions.

In some embodiments, data transmitted between the first client device, the second client device, or the one or more servers is limited to the first changeset or the second changeset.

In some embodiments, data to be synchronized via the synchronization request is decided via a language-native query.

In some embodiments, the language-native query is processed on the one or more servers.

In some embodiments, the language-native query is in a first query language of the first client device or the second client device and is translated to a second query language of the one or more servers.

In some embodiments, permissions to access the translated query are added.

In some embodiments, a filtered set of data is identified for synchronization based on execution of the translated and permissioned query.

In some embodiments, needed data is identified by the one or more servers based on at least one changeset to be processed on the first client device or the second client device.

In some embodiments, at least one query may be updated.

In some embodiments, the synchronizing of the database may be coordinated with an application on the first client device or the second client device.

Some embodiments are directed to a computer implemented method comprising: accessing, at a first client device, a first changeset that is representative of an operation performed on a data object in a database by the first client device; transmitting, from the first client device and to one or more servers, a synchronization request for synchronizing the database with one or more changesets generated by a second client device; receiving, at the first client device and from the one or more servers in response to the synchronization request, a second changeset that is representative of an operation performed by the second client device on the data object, wherein the data object is shared between the first client device and the second client device; and merging, at the first client device, the first changeset and the second changeset to update the data object, wherein the merging is performed based on one or more rules that are specific to a type of the operation in the first changeset and the second changeset, the merging comprising: determining a type of operation to which the first changeset corresponds and a type of operation to which the second changeset corresponds; responsive to determining that at least one of the first changeset or the second change set corresponds to a first type of operation, applying one of the first changeset or the second changeset based on a comparison of a first timestamp associated with the first changeset and a second timestamp associated with the second changeset; and responsive to determining that at least one of the first changeset or the second change set corresponds to a second type of operation, applying one of the first changeset or the second changeset irrespective of the first timestamp associated with the first changeset and the second timestamp associated with the second changeset.

BRIEF DESCRIPTION OF THE DRAWINGS

Various aspects of at least one embodiment are discussed herein with reference to the accompanying figures, which are not intended to be drawn to scale. The figures are included to provide illustration and a further understanding of the various aspects and embodiments, and are incorporated in and constitute a part of this specification, but are not intended as a definition of the limits of aspects herein. Where technical features in the figures, detailed description or any claim are followed by references signs, the reference signs have been included for the sole purpose of increasing the intelligibility of the figures, detailed description, and/or claims. Accordingly, neither the reference signs nor their absence are intended to have any limiting effect on the scope of any claim elements. In the figures, each identical or nearly identical component that is illustrated in various figures is represented by a like numeral. For purposes of clarity, not every component may be labeled in every figure. In the figures:

Those skilled in the art will appreciate that the logic and process steps illustrated in the various flow diagrams discussed below may be altered in a variety of ways. For example, the order of the logic may be rearranged, sub-steps may be performed in parallel, illustrated logic may be omitted, other logic may be included, etc. One will recognize that certain steps may be consolidated into a single step and that actions represented by a single step may be alternatively represented as a collection of sub-steps. The figures are designed to make the disclosed concepts more comprehensible to a human reader. Those skilled in the art will appreciate that actual data structures used to store this information may differ from the figures and/or tables shown, in that they, for example, may be organized in a different manner; may contain more or less information than shown; may be compressed, scrambled and/or encrypted; etc.

DETAILED DESCRIPTION

Various example embodiments will now be described. The following description provides certain specific details for a thorough understanding and enabling description of these examples. One skilled in the relevant technology will understand, however, that some of the disclosed embodiments may be practiced without many of these details.

Likewise, one skilled in the relevant technology will also understand that some of the embodiments may include many other obvious features not described in detail herein. Additionally, some well-known structures or functions may not be shown or described in detail below, to avoid unnecessarily obscuring the relevant descriptions of the various examples.

The terminology used below is to be interpreted in its broadest reasonable manner, even though it is being used in conjunction with a detailed description of certain specific examples of the embodiments. Indeed, certain terms may even be emphasized below; however, any terminology intended to be interpreted in any restricted manner will be overtly and specifically defined herein.

Figure 1:
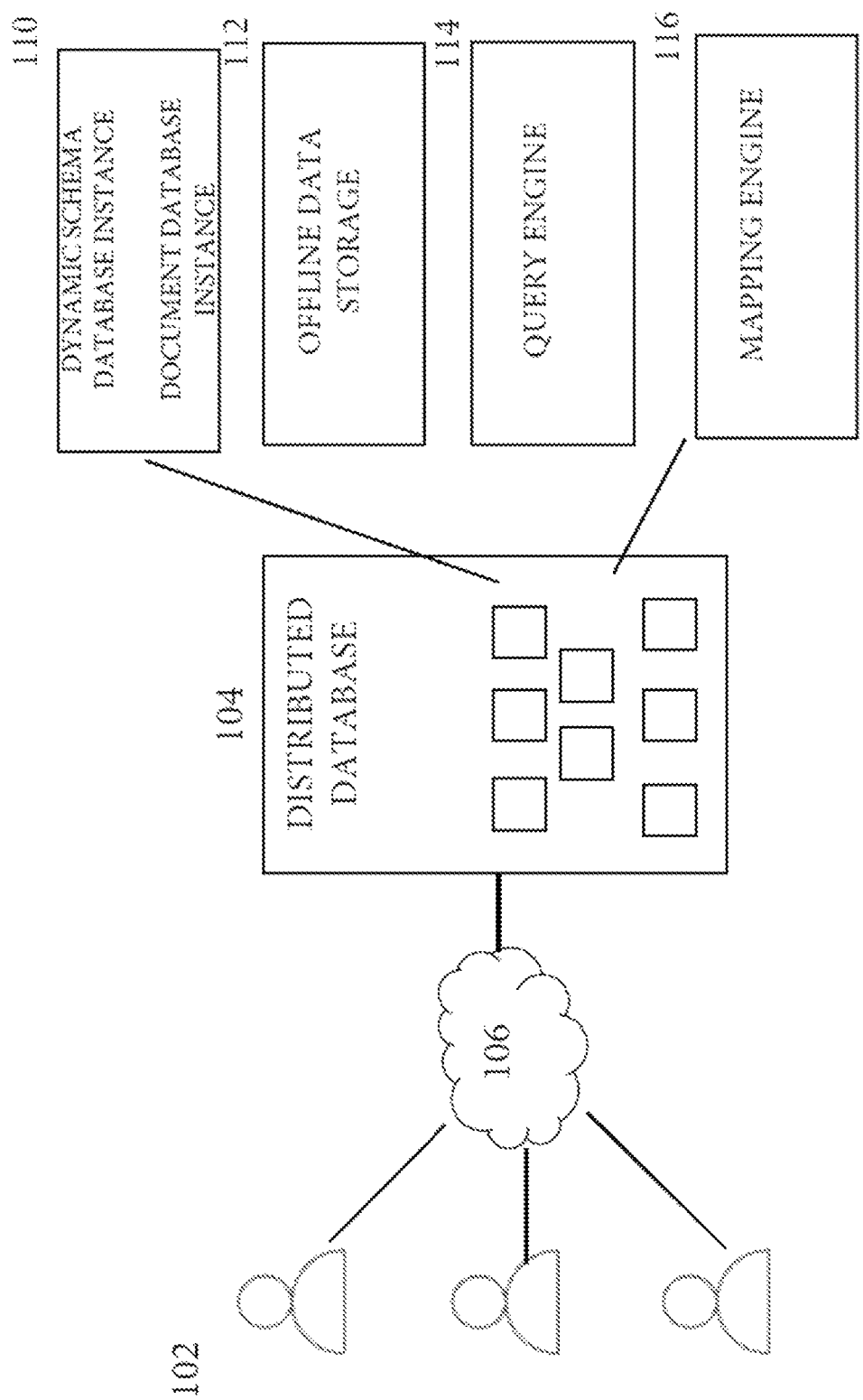
FIG. 1 is a block diagram of an example system with a distributed database, according to some embodiments.

FIG. 1 is a block diagram of an example system with a distributed database, according to some embodiments. Shown at 102, database clients and/or users can access a dynamic schema database 104 via a network 106. Users can submit queries that are executed by the database 104. In various embodiments, the database system can include a query engine configured to accept and process user queries and return data output via network 104. In some embodiments, the database 104 includes data under a dynamic or unstructured schema. Dynamic and/or unstructured databases do not enforce any data type limitations and can store structured and unstructured data. According to one embodiment, the known MongoDB database is an example of a dynamic and/or unstructured database. In MongoDB, data assets or base units of data are stored as BSON formatted documents. BSON are a binary serialization of java script object notation documents and store and transmit data objects consisting of attribute-value pairs, arrays (or other serializable values), and/or embedded documents.

For example, the database 104 can include a collection (e.g., a named logical grouping) of document data stored under a dynamic schema model at 110. The database 104 can also include other storage architectures and database instances (e.g., 112 offline storage or data lake storage). In various embodiments, the database includes a query engine 114 for processing any user queries and returning the results of the user queries. In some embodiments, the query engine is configured to execute an aggregation pipeline to process a user query on dynamic schema data. The known MongoDB database provides for aggregation operations that handle expressive queries efficiently on dynamic or unstructured data, as well as integrate with offline storage options. According to one embodiment, the database 104 can include an aggregation framework for processing queries according to a plurality of execution stages. MongoDB employs operators and execution of aggregations like $match, $unwind, $project, etc., to ensure efficient output from querying dynamic or unstructured data. Further embodiments introduce a $sql stage/aggregation operation to the aggregation framework to accept and interpret structured language queries to be executed on structured, dynamic, or unstructured data. In one example, the system and/or query engine 114 can include a mapping engine 116 configured to map incoming structured language queries into native operations that can leverage the full functionality of any underlying database implementation (e.g., MongoDB). In other embodiments, the mapping engine and/or query engine is configured to translate structured query statements into data environments and binding values that correspond to the structured queries. The definition of the operation's environment and corresponding binding values enables the query engine to accurately and consistently capture structured, non-structured and/or dynamic schema data without ambiguity or error.

In various embodiments, the query engine 114 and/or mapping engine 116 can be configured to identify structured query language query elements and manage their execution, for example, as part of a structured query language execution stage. In one example, the system is configured to accept queries from users who specify queries and/or portions of queries using specific query notation (e.g., $sql follow by query parameters). The query engine 114 and/or mapping engine can be configured to manage execution of the structured query language portion of the query and pass any output, to the user in response to the query or to another processing stage that employs the output of the prior stage for further processing. Similarly, the query engine 114 can be configured to execute other aggregation stages and pass their output to a $sql stage for further processing.

According to some embodiments, the query engine 114 and/or mapping engine 116 can be configured to process query functions in a $sql stage. The query engine 114 and/or mapping engine 116 can include processing rules and/or functions detailed in a query dialect configured to process structured query language, and may include mapping the structured query language into native expressive functions. In some embodiments, the mapping engine 116 can be called by the query engine as part of execution of an aggregation pipeline and/or stage. In other embodiments, the mapping engine can be a component or sub-component of the query engine, and in still others, the query engine can execute the functions described with respect to the mapping engine.

Embodiments herein merge the changes made by two or more mobile devices after the application of specific rules. The rules ensure that both sides always end up converging to the same result, even though they may have applied the changes in a different order. This means that there is no longer the kind of perfect consistency that one could have in a traditional database. Rather, embodiments herein provide what is termed strong eventual consistency. The tradeoff is that it is necessary to be aware of the rules to ensure the consistent result this is desired, but the upside is that by following a few rules one can have devices working entirely offline and still converging on meaningful results when they meet.

In some embodiments, data layers must choose two attributes out of consistency, availability, and partition-tolerance. The inventors have recognized that in the face of a network partition (i.e., some nodes of the system may be functioning, but unable to communicate) with some embodiments, nodes on both sides of the network partition may continue to write data (providing availability and partition-tolerance) and data will become consistent via a set of rules when all devices are online (i.e., eventual consistency). In some embodiments, the property is that devices are fully available offline and the rules are just part of the protocol that enable this.

At a very high level, the rules are as follows:

Deletes always win. If one side deletes an object it always stays deleted, even if the other side has made changes to it later on.

Last update wins. If two sides update the same property, the value ends up as the last updated.

Inserts in lists are ordered by time. If two items are inserted at the same position, the item that was inserted first ends up before the other item. This means that if both sides append items to the end of a list they end up in order of insertion time.

In some embodiments, a primary key is a property whose value uniquely identifies an object in a realm, just as a primary key in a conventional relational database is a field that uniquely identifies a row in a table. Primary keys are not required by all embodiments, but they can be enabled on any object type. One can add a property to a model class to use as the primary key, such as id, and then let the system know that property is the primary key. In some embodiments, the method for doing that is dependent on the language used; in Cocoa, override the primaryKey( ) class method, whereas Java and .NET use annotations.

Once a model class has a primary key, the system ensures that no other object can be added to the realm with the same key value. One can update the existing object; in fact, one can update only a subset of properties on a specified object without fetching a copy of the object from the realm.

In some embodiments, strings are special in that one can see them both as scalar values and as lists of characters. This means that the string can be set to a new string, replacing the entire string, or the string can be edited. If multiple users are editing the same string, conflicts should be handled at the character level, similar to the experience in applications such as Google docs.

In some embodiments counters are not exposed in all client APIs.

In some embodiments, using integers for counting is also a special case. The way that most programming languages would implement an increment operation (such as v+=1), is to read the value, increment the result, and then store it back. This obviously does not work if there are multiple parties doing it simultaneously; they may both read 10, increment it to 11, and when it merges one would get the result of 11 rather than the intended 12.

To support this common use case, embodiments offer a way to express the intent that a user is incrementing (or decrementing) the value, giving enough hints to the merge that it can reach the correct result. Just as with the strings above, it gives one the choice of updating the entire value, or editing it in a way that conveys more meaning, and allows more precise control of the conflict resolution.

Figure 3:
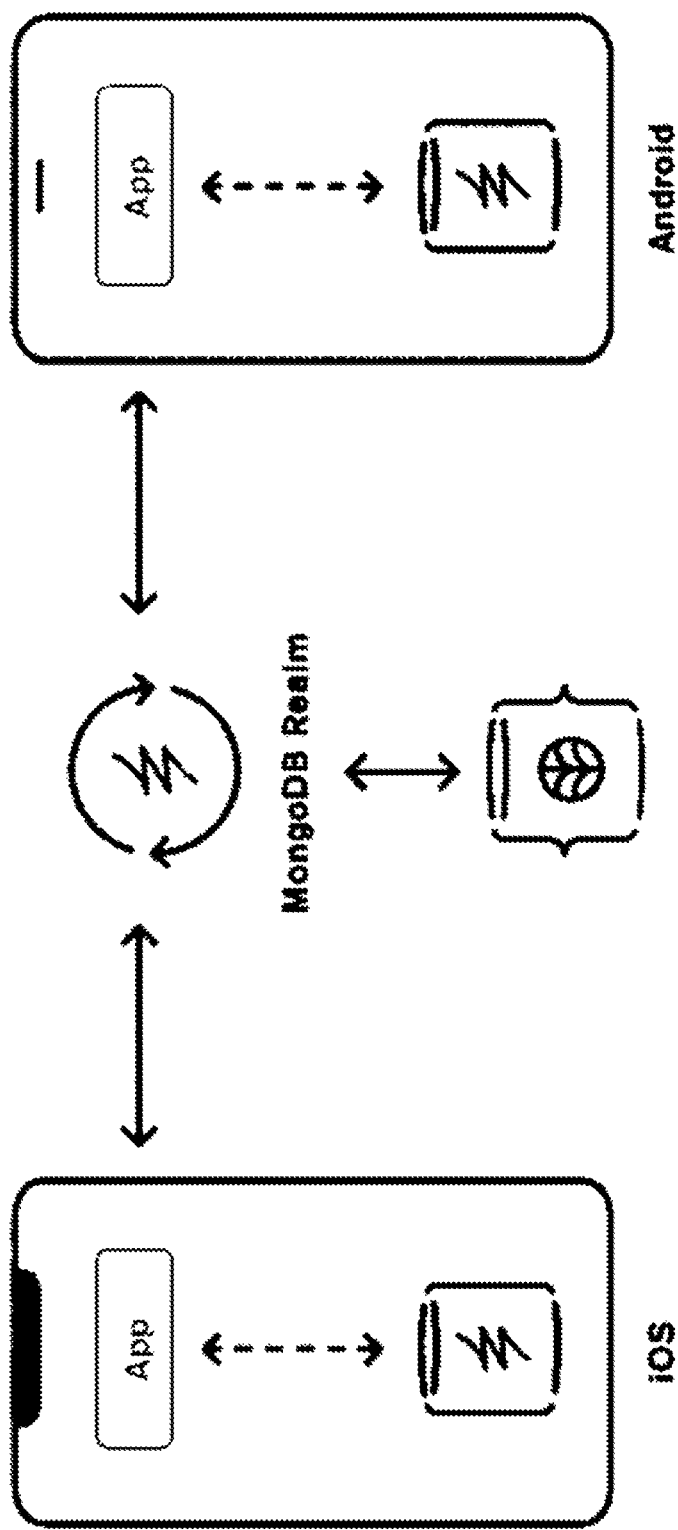
FIG. 3 is a diagram of an example system with multiple smartphones, according to some embodiments.
Figure 4:
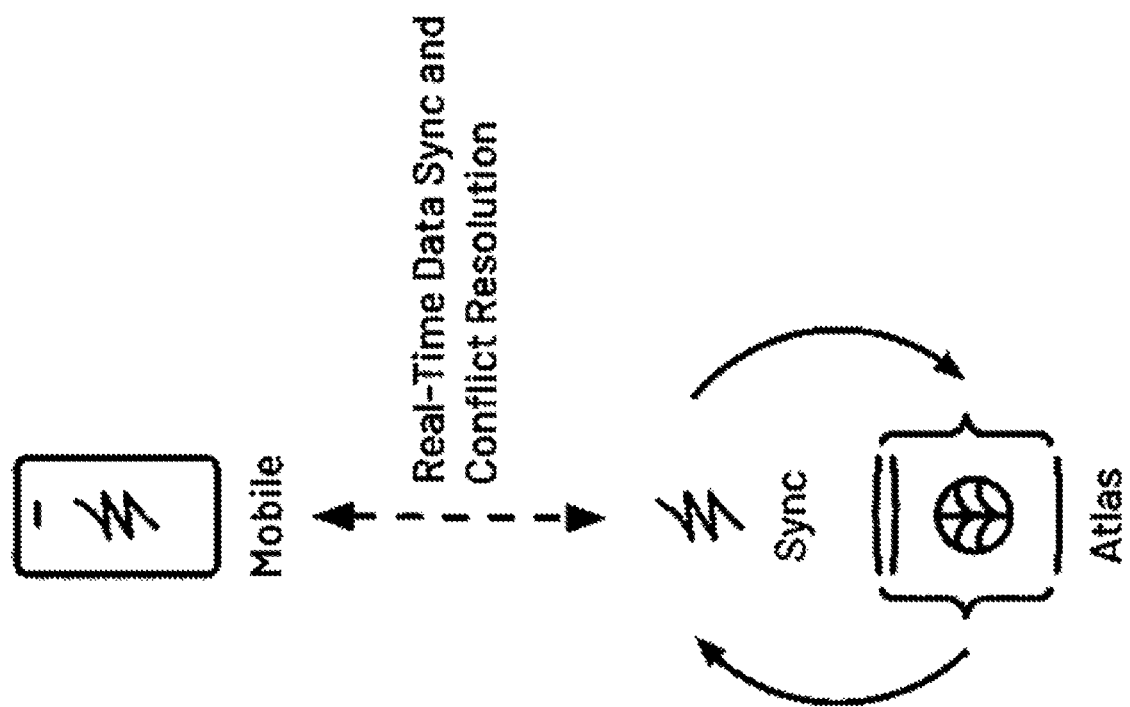
FIG. 4 is a diagram of an example system showing data sync and conflict resolution, according to some embodiments.

FIG. 3 is a diagram of an example system with multiple smartphones, according to some embodiments. FIG. 4 is a diagram of an example system showing data sync and conflict resolution, according to some embodiments.

The inventors have recognized that synchronization interactions more applicable to modern applications and user needs may be provided by making them "flexible" across 3 key domains: data, permissions, and schema. For data, some embodiments may define the subset of data synchronized via a query and dynamically update this within an application at any point in time while keeping data transfer efficient. For permissions, some embodiments may have field-level permissions that bind on session start and can be dynamically decided per session. For schema, some embodiments may provide data validation to be dictated at the field level and updated at any point, with provisions for handling invalid data at the client level.

Some conventional systems let app developers build reliable, offline-first mobile apps that serve data to millions of end users. The inventors have recognized that conventional systems have worked well for apps where data is compartmentalized and permissions rarely change, but dynamic use cases with evolving permissions required workarounds.

The inventors have recognized that even the most complex use cases can be enabled out-of-the-box without requiring any custom code. For example, custom code is on network retry API logic. Such code can make something feel real-time/event-driven even if it is not.

The inventors have recognized that it may be advantageous for all devices to have some subset of data from a backend store, but with no restrictions as to what that subset is (outside what is permitted by read/write permissions).

In some embodiments, evolving permissions may be possible. For example, with a school database including students, teachers, principals, each has different levels of access. Students can read their data, maybe with some write access; teachers can read their data and write to some data; principals can access almost everything, both read and often write.

Figure 7:
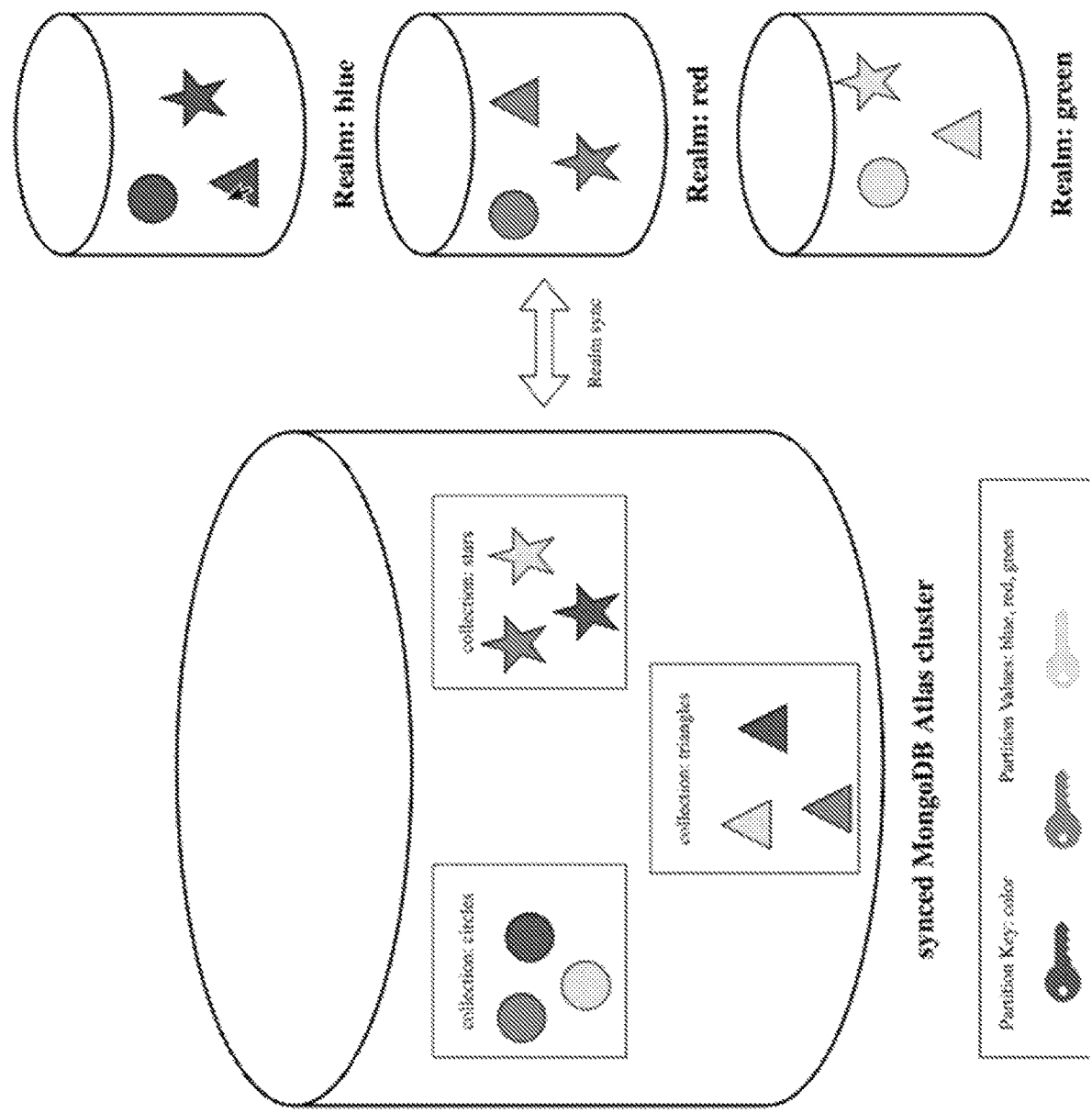
FIG. 7 is a block diagram of exemplary partitioned data access, according to some embodiments.
Figure 8:
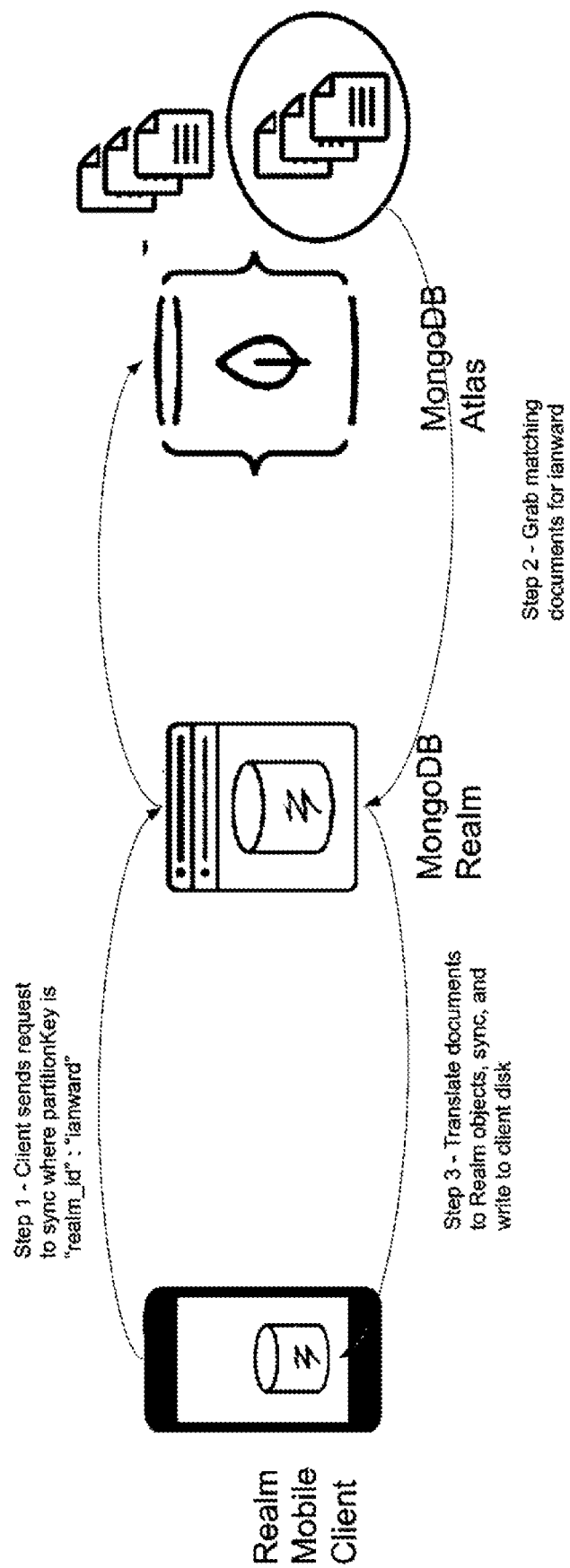
FIG. 8 is a diagram of exemplary partitioned data access with exemplary processes, according to some embodiments.
Figure 9:
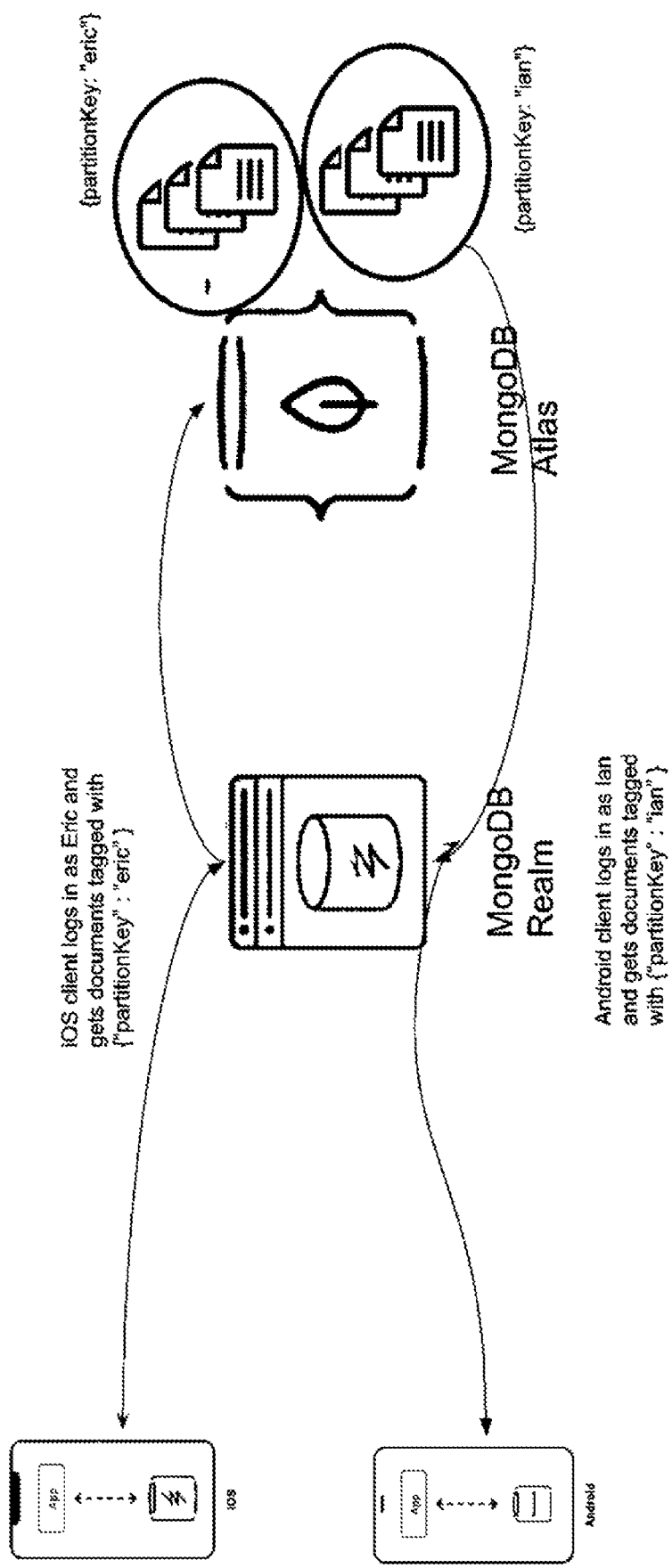
FIG. 9 is a diagram of exemplary partitioned data access with additional exemplary processes, according to some embodiments.
Figure 10:
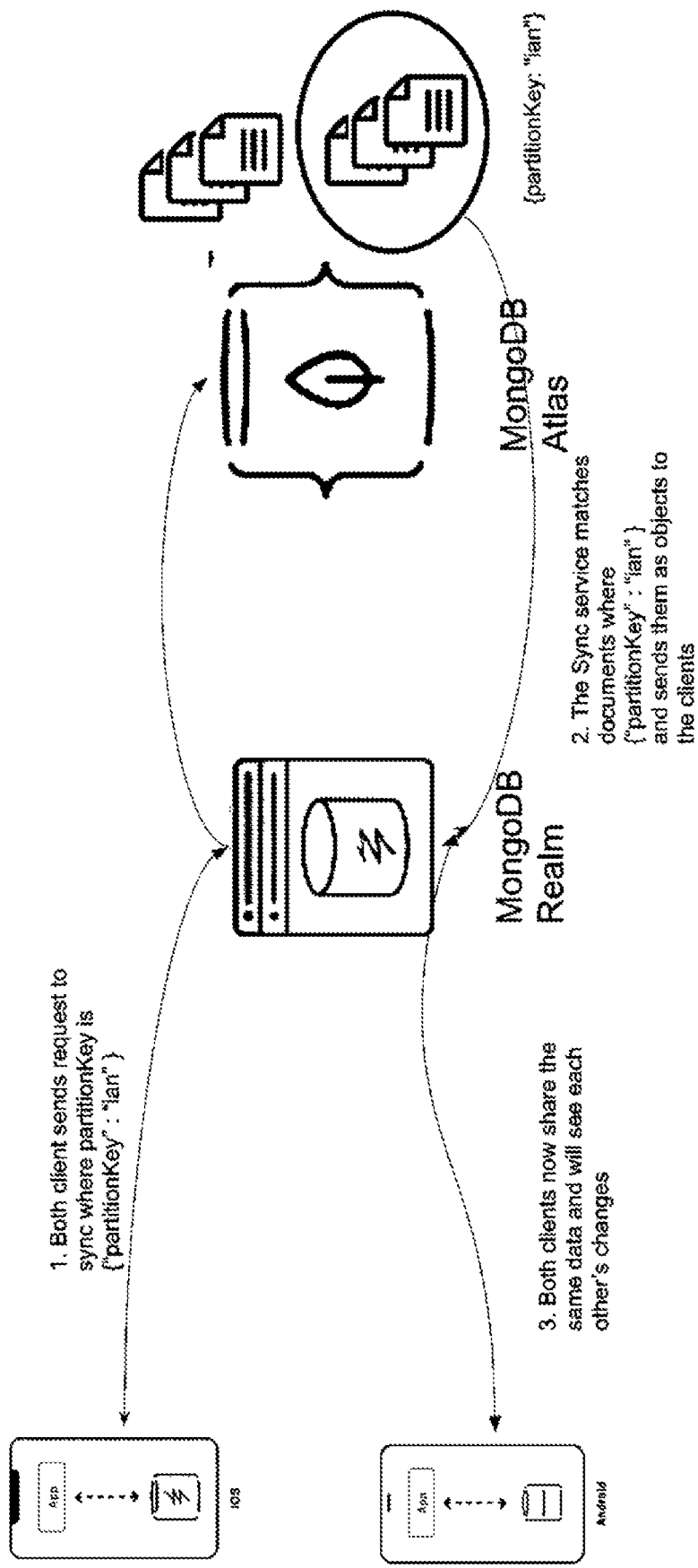
FIG. 10 is a diagram of exemplary partitioned data access with more exemplary processes, according to some embodiments.

Conventionally, data needed to be split into chunks and defined at that level; data had to live in separate partitions. FIG. 7 shows an example of partitioned data access. FIGS. 8-10 show examples of processes used with partitioned data access.

In some embodiments, partitions may be avoided. Conventionally, a static partition was able to be opened with a query. However, a business often evolves in ways that require changes to such partitions. Some embodiments herein allow splitting up data dynamically, which helps avoid the limitations of partitions.

Figure 5:
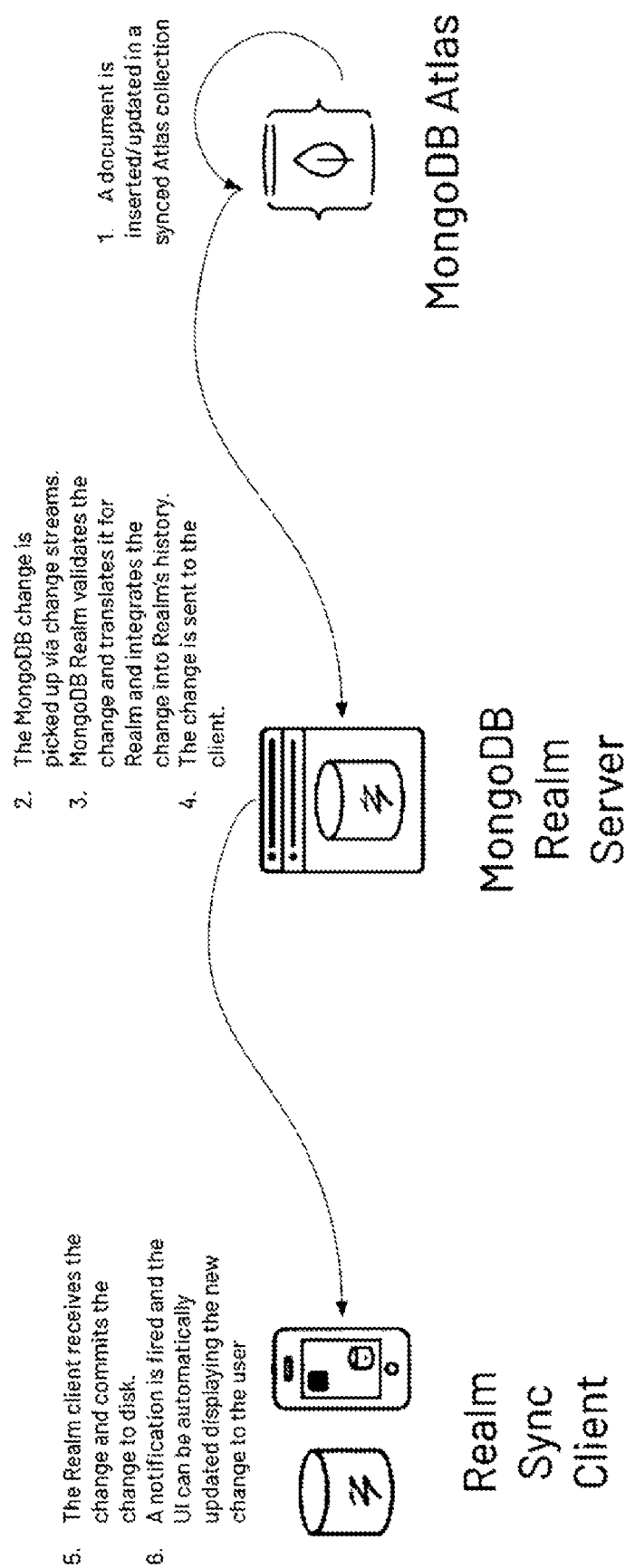
FIG. 5 is a diagram of an example system with further exemplary processes, according to some embodiments.
Figure 6:
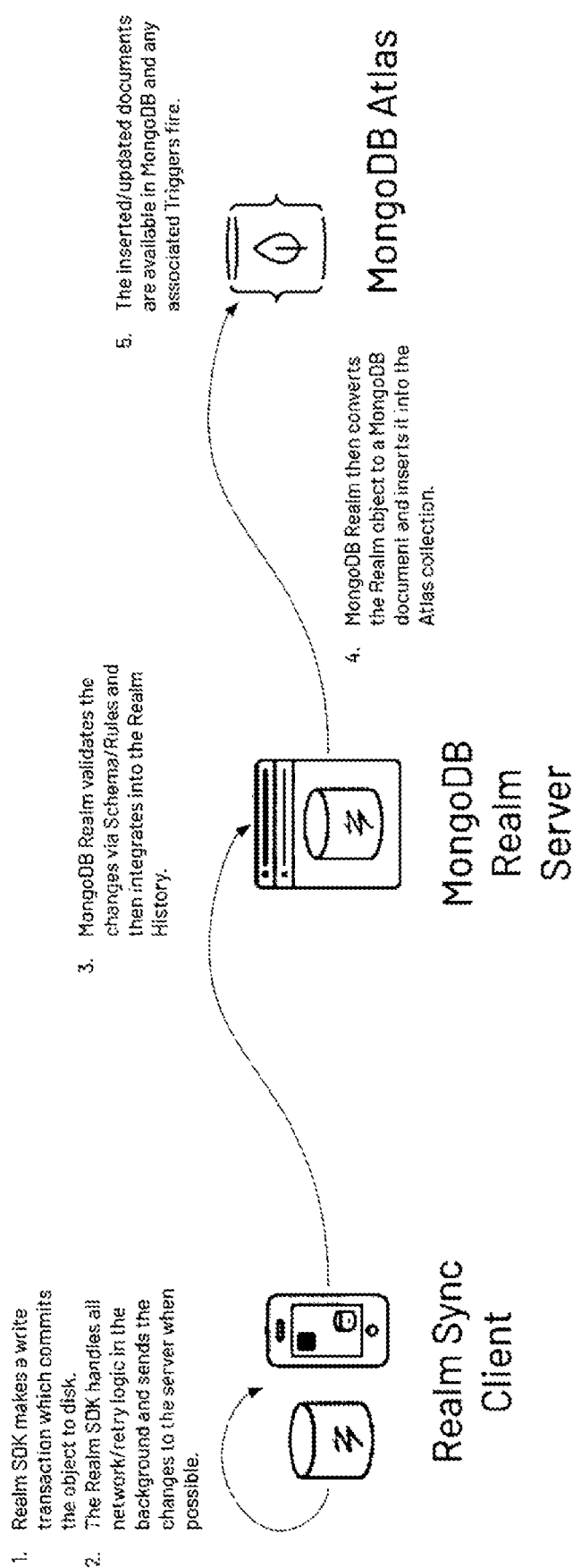
FIG. 6 is a diagram of an example system with more exemplary processes, according to some embodiments.

For example, FIG. 5 is a diagram of an example system with further exemplary processes, according to some embodiments. FIG. 6 is a diagram of an example system with more exemplary processes, according to some embodiments. FIGS. 5 and 6 show how changes may be propagated from client to server and server to client.

In some embodiments, a first changeset may be generated at a first client device. In some embodiments, the first changeset may be representative of an operation on a data object in a database.

In some embodiments, a synchronization request may be transmitted from the first client device and to one or more servers. For example, the synchronization request may be for synchronizing the database with one or more changesets generated by a second client device.

In some embodiments, in response to the synchronization request, a second changeset may be received at the first client device and from the one or more servers. For example, the second changeset may be representative of an operation performed by the second client device on the data object. In some embodiments, the database may be shared between the first client device and the second client device.

In some embodiments, at the first client device, the first changeset and the second changeset may be merged to update the data object. In some embodiments, such merging may be performed based on data received from the server(s) (for example, more than one of the servers), which may be operating in parallel to each other.

The inventors have recognized that permissions are required in almost every app. Some embodiments apply a document-level permission model when synchronizing data, meaning synced documents can be limited based on a user's role. Some embodiments apply field-level permission. For example, a document or object has many attributes/fields. In an example of data describing pants, pants may have fields for a number of pockets, color, material, etc., as well as fields a consumer would not see but someone taking inventory in the store should be able to see.

Another example is an emergency room team, which may use their hospital's application. A resident should only be able to access their patients' charts while their fellow needs to be able to see the entire care team's charts. In some embodiments, a user's role will be combined with the client-side query to determine the appropriate result set. For example, when the resident above filters to view all patient charts, the permission system will automatically limit the results to only their patients.

In some embodiments, permissions are defined in relation to the user and the query and the data being accessed. For example, a user could request data from various data at once via a single query. In a catalog example, a user can search across multiple stores/tables with one query, and with this system, the data passes through permissions analysis based on a query and the results and the user.

In some embodiments, all processing with distributed set of clients making requests can be distributed across multiple servers. In some embodiments, those servers may be interacting with a database instance that is also distributed. For example, some embodiments may employ a "server-less" model of distributing the synchronization logic.

Some embodiments enhance query performance and optimize for real-time collaboration by treating a single object or document as the smallest entity for synchronization. For example, synchronized data may be shared between client devices more efficiently. This may come from dynamic updating where when a user updates the query, not everything is pulled. Rather, the system identifies net changes for adding or removing from the query via differentials, and when the data updates, only the new fields will be sent (or even just incrementing a value as needed).

In some embodiments, a combination of granular permissions and distributed "server-less" computing may be used. In some embodiments, these may be used with idiomatic syntax, conflict resolution (such as is described herein), and language-native queries (e.g., in a programming language, where the actual syntax varies across platforms and is adapted to the standard ways one would express queries in those platforms).

In some embodiments, data to be synchronized via a request (e.g., a request for synchronization) may be decided via a language-native query, such as one of those described above.

In some embodiments, a language-native query may be processed on one or more servers. Alternatively or additionally, a language-native query may be processed via server-less computing.

In some embodiments, a language-native query may be in a first query language of a client device and may be translated to a second query language of one or more servers. Alternatively, the second query language may be of distributed devices in a server-less computing model.

In some embodiments, permissions to access a translated query (such as the language-native query translated to the second query language described above) may be added. For example, the translated query may not be accessible without these permissions, and these permissions may be created and provided in order to grant that access, by a server, client, or distributed device.

In some embodiments, a filtered set of data may be identified for synchronization based on execution of a translated and permissioned query (such as the language-native query translated to the second query language described above). For example, after a query is translated and permissioned (such as is described above) and executed, a server, client, and/or distributed device may identify a filtered set of data for synchronization.

In some embodiments, needed data may be identified by one or more servers or a distributed device, based on at least one changeset to be processed on a client device. For example, if certain data is needed (such as by a synchronization request), the server(s) or disturbed device(s) may identify that data using one or more changesets that may be processed on a client device.

The inventors have recognized that providing some of the functionality described herein at scale (e.g., with millions of users and tens of thousands of concurrent users interacting with the data at once) is difficult because it is so complex at a server level. For example, doing dynamic updating of queries is difficult and there are many pathological cases where a lot of data or compute power is used, making it very hard to run use cases. The inventors have recognized this can be achieved at scale using distributed conflict resolution, where more hosts working in parallel are used rather than many processes working in serial.

The inventors have recognized that determining how permissions should work can be difficult, because the idea of something falling in and out of view relates to what a user can and cannot see. For example, one cannot always explicitly tell people what they are not allowed to see, because that would be exposing data. For example, if a user was changing permissions or they relied on a user based on time, etc., paying attention to all those attributes in real-time and figuring out what a user can or cannot see or edit vastly grows the complexity of computations that must take place.

The inventors have recognized that sessions (e.g., logging in to start a session) may be used to determine permissions. For example, permissions are locked based on dynamic attributes at start of the session. When a user sends a query, the logic of selecting roles across different collections has been pre-run and locked at the session level, so they only need to submit the query and that is determined based on what was determined at the start of the session.

In some embodiments, permissions evolve across sessions, rather than within a single session. For example, a system can still force a sign-out during a session if someone is fired, quits, etc.

In some embodiments, metadata is stored to facilitate a request process in an internal cluster rather than a customer cluster. For example, all the customer's data and their history changes resides in their cluster.

Some embodiments may make it easier to integrate data from mobile devices to the backend (e.g., a cloud-based backend). For example, some embodiments may make data accessible both on a mobile app and back-end systems, such as for bi-directional data replication.

The inventors have recognized that in an offline-first environment, edge-to-cloud data synchronization typically requires thousands of lines of complex conflict resolution and networking code, and it may leave developers with code bloat that slows the development of new features in the long-term. Some embodiments herein simplify moving data (e.g., between a client and server(s)). The inventors have recognized that with huge amounts of boilerplate code eliminated, teams may be able to focus on the features that drive positive application reviews and satisfied users.

The inventors have recognized that embodiments herein may transform the way developers are building data synchronization into their mobile applications, and the way developers are creating workarounds for complex synchronization use cases.

Some embodiments may take into account a year's worth of user feedback on partition-based sync, and may aim to make syncing data (e.g., to server(s)) a simple and idiomatic process by using a client-defined query to define the data synced to user applications.

Some embodiments may allow developers to start writing code that synchronizes data more quickly, allowing users to choose which data is synced via a language-native query and to change the queries that define your syncing data at any time.

In some embodiments, developers can enable devices to define a query on the client side (e.g., using the Realm query-language), which will execute (e.g., on server(s)) to identify the set of data to synchronize. In some embodiments, any documents that match the query will be translated to Realm Objects and saved to the client device's local disk. In some embodiments, the query will be maintained on the server, which will check in real-time to identify if new document insertions, updates, or deletions (e.g., on server (s)) change the query results. In some embodiments, relevant changes on the server-side will be replicated down to the client in real-time, and any changes from the client will be similarly replicated to server(s).

Some embodiments are distinctly different from partition-based sync. In some embodiments, with partition-based sync, developers must configure a partition field for their database (e.g., the remote database on the server(s)). In some embodiments, this partition field lives on each document within the database that the operator wants to sync. In some embodiments, clients can then request access to different partitions of the database, using the different values of the partition key field. In some embodiments, when a client opens a synchronized Realm, they pass in the partition key value as a parameter. In some embodiments, the sync server receives the value from the client, and sends any documents down to the client that match the partition key value. In some embodiments, these documents are automatically translated as Realm Objects and stored on the client's disk for offline access.

The inventors have recognized that partition-based sync works well for applications where data is static and compartmentalized, and where permissions models rarely need to change. In some embodiments, making fine-grained and flexible permissioning is possible, as is opening up new application use cases through simplifying the syncing of data that requires ranged or dynamic queries.

Some embodiments, unlike with partition-based sync, make it seamless to implement the document-level permission model when syncing data, meaning synced fields can be limited based on a user's role.

In some embodiments, a healthcare app may be used, with different field-level permissions for patients, doctors, and administrative staff using the application. In some embodiments, a patient collection contains user data about the patient, their health history, procedures undergone, and prognosis. In some embodiments, the patient accessing the app would only be able to see their full healthcare history, along with their own personal information. Meanwhile, in some embodiments, a doctor using the app would be able to see any patients assigned to their care, along with healthcare history and prognosis. In some embodiments, doctors viewing patient data would be unable to view certain personal identifying information, like social security numbers. In some embodiments, administrative staff who handle billing would have another set of field-level permissions, seeing only the data required to successfully bill the patient.

In some embodiments, this is made possible when the query sent by the client is run and a result set is obtained, and then any data from the result set sent down to the client based on the permissions is subtracted. In some embodiments, the server guards against clients receiving data the clients are not allowed to see, and developers can trust that the server will enforce compliance, even if a query is written with mistakes. Some embodiments simplify sharing subsets of data across groups of users and make it easier for an application's permissions to mirror complex organizations and business requirements.

Some embodiments also allow clients to share some documents but not others, based on the ResultSet of their query. In some embodiments, a company may have teams that typically share all the data within their respective teams, but not across teams. When a new project requires teams to collaborate, some embodiments make this easy. For example, the shared project documents could have a field called allowedTeams: [marketing, sales]. In some embodiments, each member of the team would have a client-side query, searching for all documents on allowedTeams matching marketing or sales using an $in operator, depending on what team that user was a member of.

A primary benefit is that some embodiments allow for simple synchronization of data that falls into a range (such as a time window) and automatically adds and removes documents as they fall in and out of range.

In some embodiments, an app may be used by a company's workforce, where the users only need to see the last seven days of work orders. In some embodiments, with partition-based sync, a time-based trigger may need to fire daily to move work orders in and out of the relevant partition. In some embodiments, a developer can write a ranged query that automatically includes and removes data as time passes and the 7-day window changes. The inventors have recognized that by adding a time based range component to the query, code is streamlined. In some embodiments, the sync ResultSet gets a built-in TTL, which previously had to be implemented by the operator on the server-side.

The inventors have recognized that some embodiments may satisfy desires to eliminate every possible piece of boilerplate code for developers. Some embodiments may deliver a sync service that can fit any use case or schema design pattern one can imagine, so that a user can spend their time building features rather than implementing workarounds.

The inventors have recognized the benefits of adding very granular control of what is pushed and added, as well as dynamic control of this. For example, some embodiments support dynamic, overlapping queries based on user inputs. As an example of dynamic queries (with changing filters), a user starts looking at a catalog on their mobile phone, then narrows to pants and shirts, and then narrows to pants and shirts that are black. Some embodiments change what is synchronized with the mobile app on the fly. In some embodiments, in the same application, employees can quickly limit inventory results to only their store's stock, pulling from the same set of documents as the customer, without worrying about overlap.

The school example above is an example of overlapping queries.

In some embodiments, synchronization is in real-time, where the user selects via query what is synchronized between two systems. In some embodiments, both ends may be both readable and writable (e.g., via distributed conflict resolution). In contrast with a conventional call and response system, where systems pass events between each other as they happen, some embodiments can do everything "offline."

In some embodiments, events may be passed between the two systems, which may build from distributed conflict resolution to make more dynamic and easier to choose subsets of data, with granular permissions.

In some embodiments, steady-state routing may be used. For example, a query may be used with things being dynamically part of that query. In a catalog example, if capris were added to a catalog and defined as being a type of pants then all users who were syncing "pants" would start syncing capris automatically. If a child is updated to different class, that child would not appear in a query for that class, and any existing applications that were syncing data for that class would see the child removed.

Exemplary Features

Figure 11:
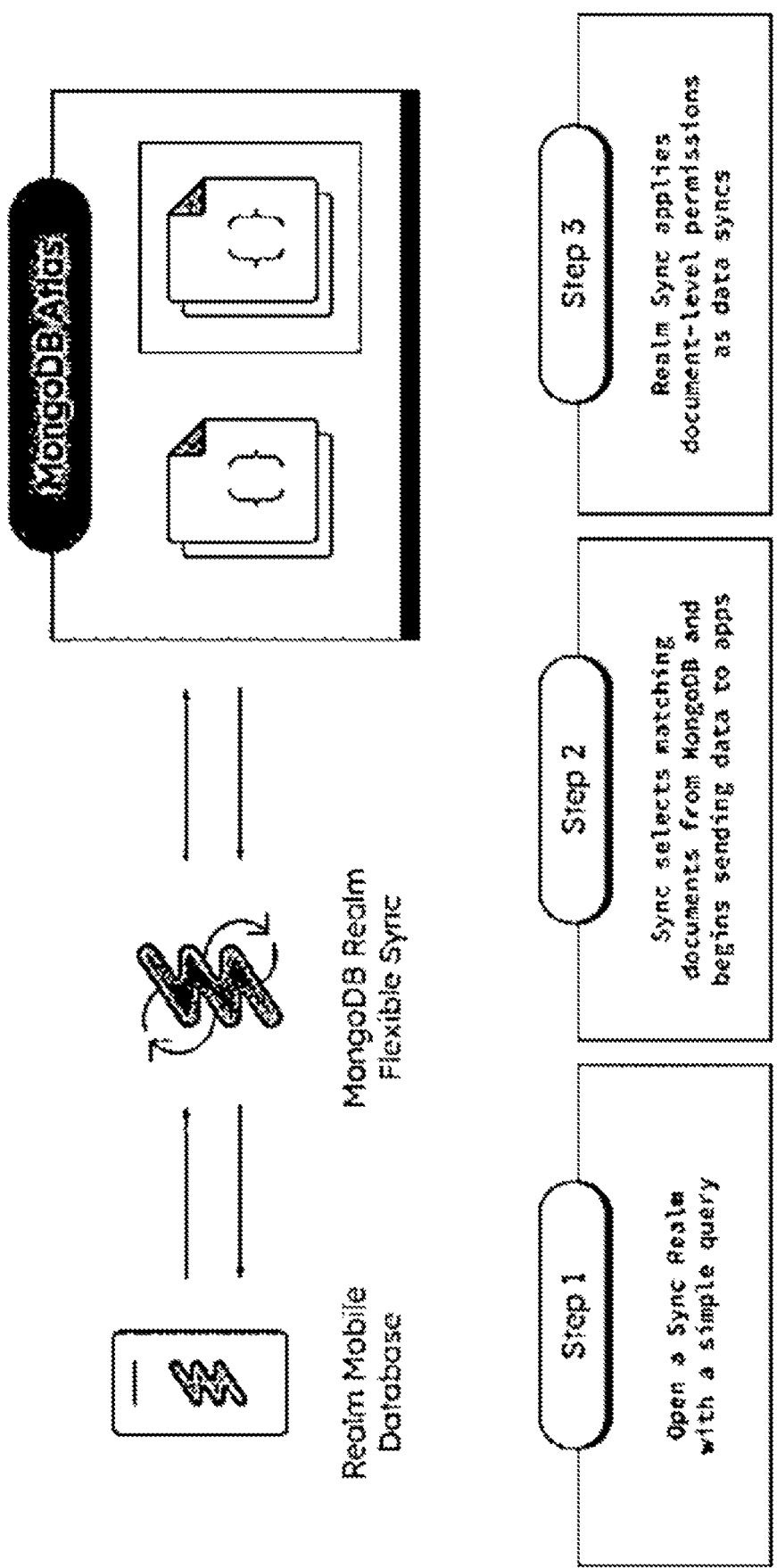
FIG. 11 is a diagram of an exemplary process for a simple query, according to some embodiments.

In some embodiments, fast, efficient edge-to-cloud sync may be possible. For example, a user may sync only the data they need, every time. In some embodiments, an exemplary process (such as shown in FIG. 11) may include a first stage in which a simple query may be used to open a sync realm. In some embodiments, the exemplary process may include a second stage in which matching documents may be selected from MongoDB and data may be sent to applications. In some embodiments, the exemplary process may include a third stage in which document-level permissions may be applied as data syncs. In some embodiments, the exemplary process may end or repeat as desired.

Figure 12:
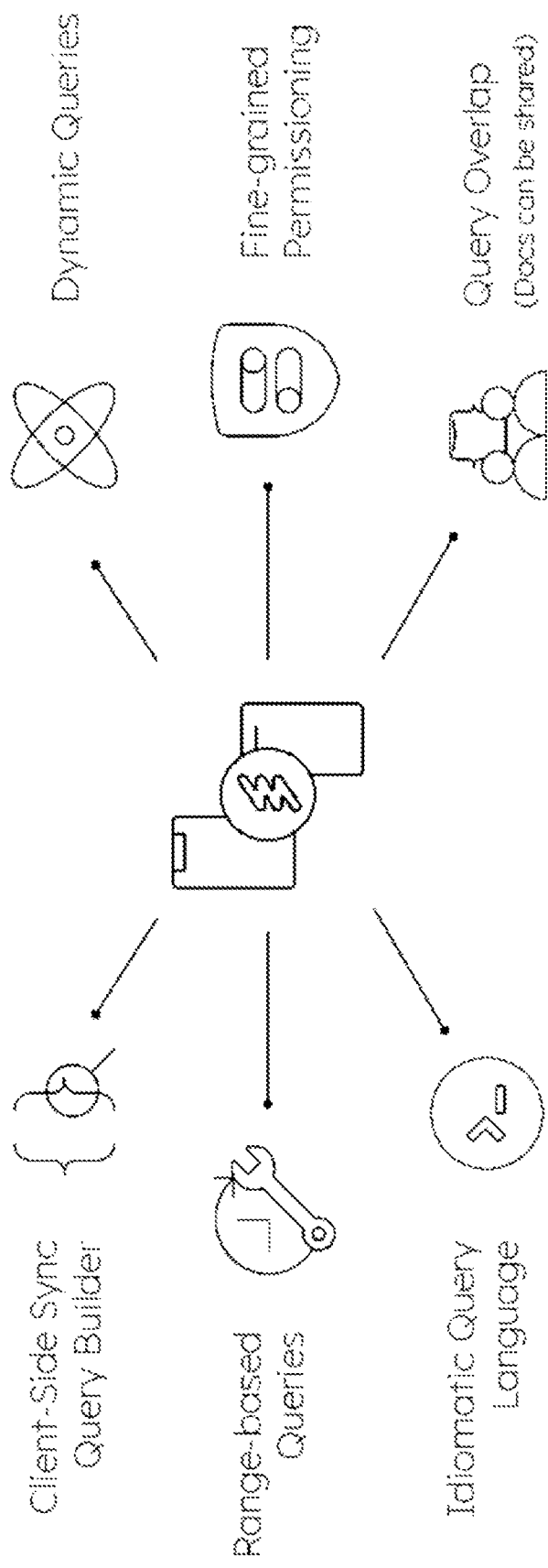
FIG. 12 is a diagram of exemplary features that assist edge-to-cloud synchronization, according to some embodiments.

In some embodiments, building edge-to-cloud synchronization may be made easier and faster than conventionally was the case. In some embodiments, this may be possible at least in part due to features shown in FIG. 12, such as Client-Side Sync Query Builder, Range-based Queries, Idiomatic Query Language, Dynamic Queries, Fine-grained Permissioning, and/or Query Overlap (e.g., documents can be shared).

Some embodiments may enable mobile developers to build edge-to-cloud synchronization in an idiomatic manner. For example, queries may be used. Some embodiments may provide fine-grained permissioning, which meets rigorous security requirements. Some embodiments may define complex sync logic using dynamic and range-based queries. For example, no custom code may be necessary.

In some embodiments, an edge-to-cloud data synchronization service may be provided. In some embodiments, such a service may help customers build reliable, offline-first mobile applications that serve data to millions of end users (e.g., from leading telematics providers to chart-topping consumer apps).

The inventors have recognized and appreciated that historically, such a service may have worked well for applications where data is compartmentalized and permissions rarely change, but that dynamic use cases with evolving permissions required workarounds. The inventors have recognized and appreciated usability can be extended using some embodiments herein. Some embodiments may enable even the most complex use cases out-of-the-box without requiring any custom code.

Some embodiments (e.g., query-based) can enable a user to send a query from their device using a set of queryable fields.

Some embodiments can allow language-native queries to define the data synced to user applications. For example, this more closely mirrors how users are used to building applications today (such as using GET requests with query parameters) making it easy to learn and fast to build.

Figure 13:
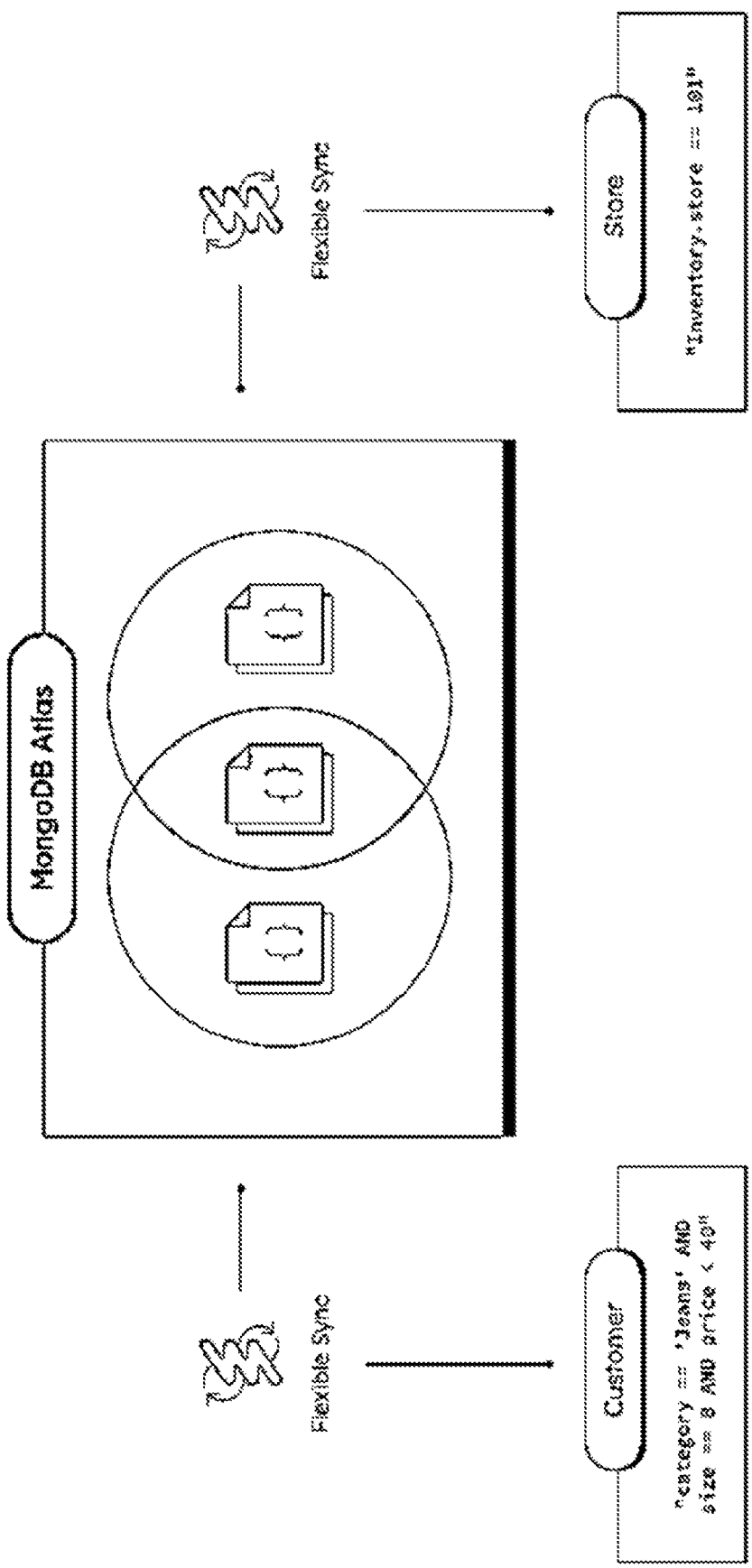
FIG. 13 is a diagram of exemplary inputs being used, according to some embodiments.

Some embodiments may support dynamic, overlapping queries based on user inputs, as described above. For example, a retail application may allow users to search available inventory where users define inputs (e.g., show all jeans that are size 8 and less than $40), and the query parameters can be combined with logical ANDs and ORs to produce increasingly complex queries and narrow down the search result even further. In some embodiments, all of such query results may be combined into a single realm file on the client's device, which significantly simplifies code required on the client-side. FIG. 13 shows an example of such inputs being used according to some embodiments.

Exemplary Architecture and Designs

Figure 14:
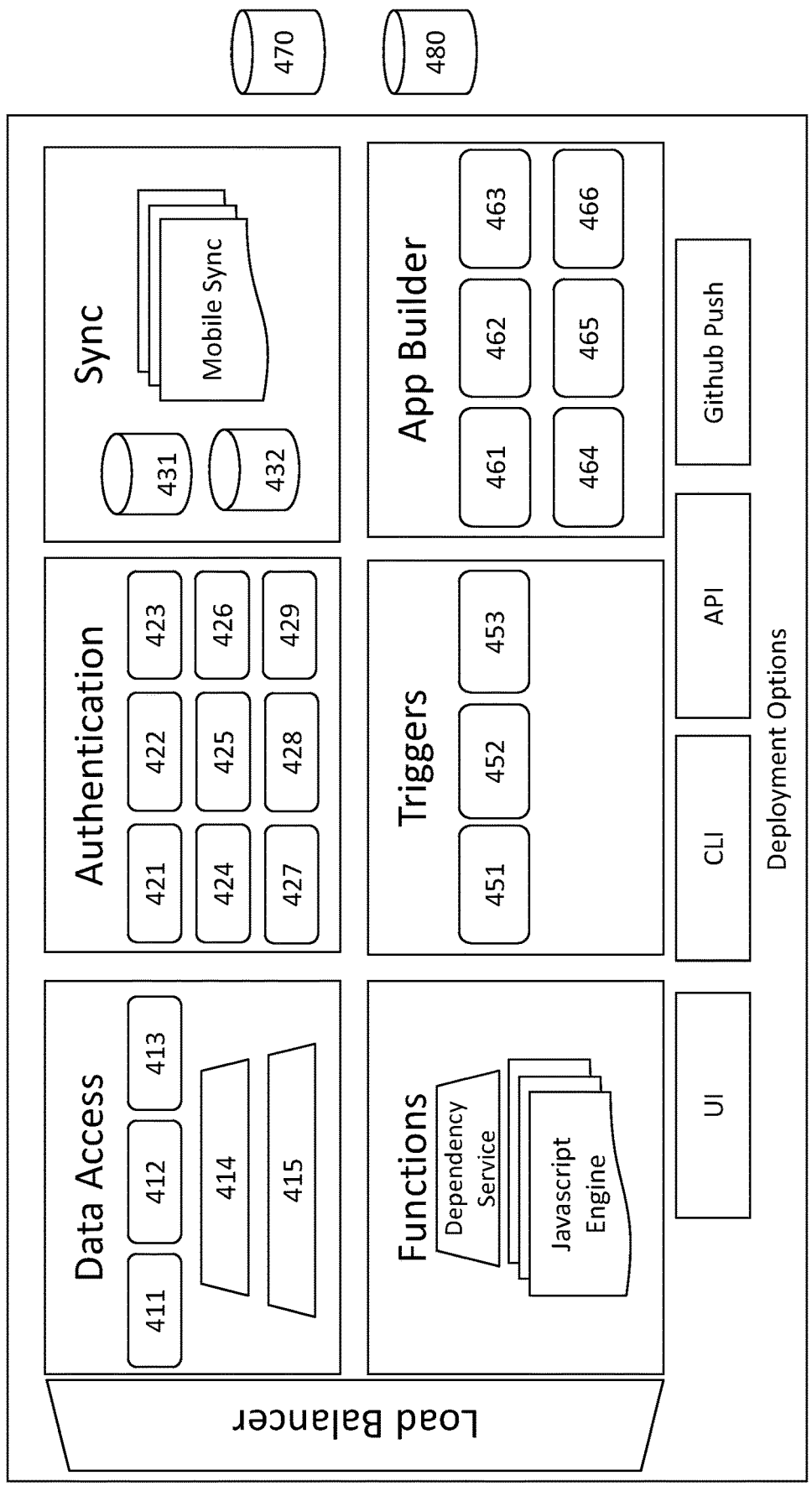
FIG. 14 is a diagram of an exemplary architecture, according to some embodiments.

FIG. 14 shows an exemplary architecture, according to some embodiments. The architecture may include logic for load balancer, data access, authentication, sync, functions, triggers, and app builder, as well as deployment options including user interface (UI), command line interface (CLI), application programming interface (API), and Github Push. In some embodiments, the data access logic may include GraphQL 411, Query Anywhere 412, Data API 413, Schema Engine 414, and Rules/Permissions Engine 415. In some embodiments, the authentication logic may include Anonymous 421, API Key 422, Google 423, Email Password 424, JWT 425, Facebook 426, Anonymous 427 (which may be different from or the same as Anonymous 421), Function Based 428, and Apple 429. In some embodiments, the sync logic may include local realm 431, local realm 432 (which may be different from or the same as local realm 431), and at least one mobile synchronization.

In some embodiments, the functions logic may include a dependency service and at least one JavaScript engine. In some embodiments, the triggers logic may include Database 451 (which may react to changes in MongoDB), Authorization 452 (which may react to authentication events), and Scheduled 453 (which may run a function at specified intervals (CRON)). In some embodiments, the app builder logic may include Static Hosting 461, Logging 462, Alerting 463, Connection Pooling 464, HTTPS Endpoints 465, and Alerting 466 (which may be different from or the same as Alerting 463).

Figure 15:
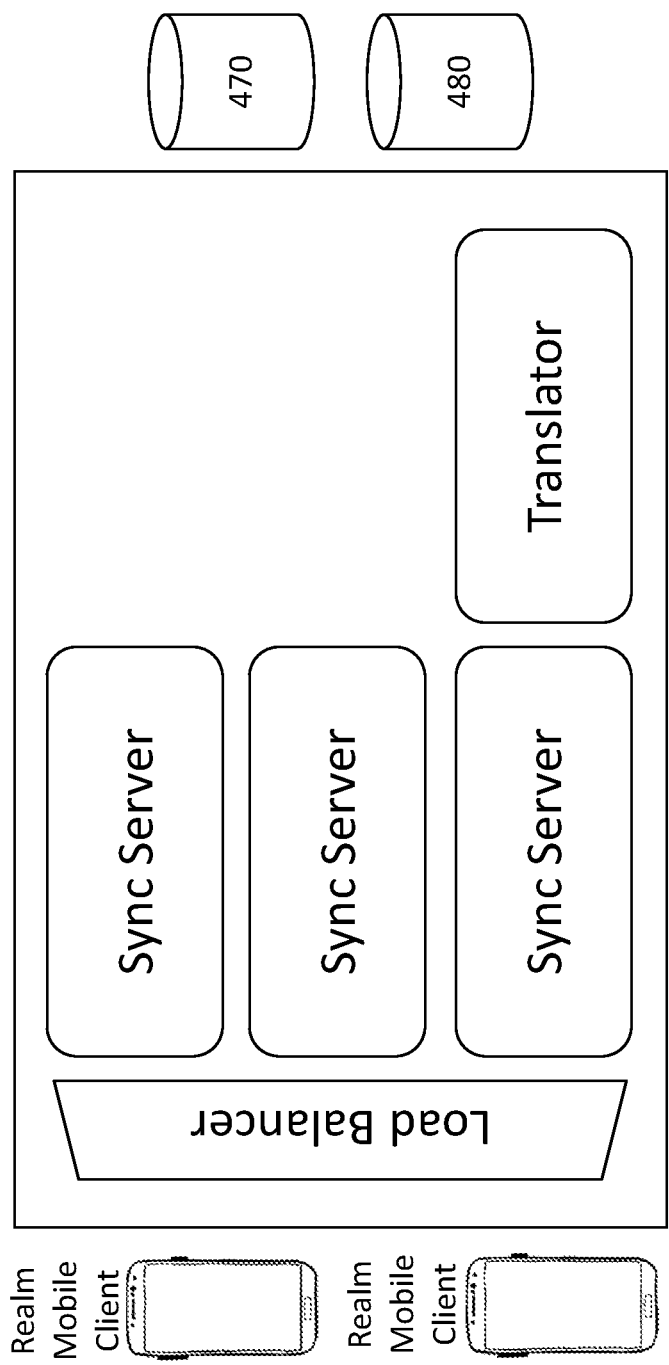
FIG. 15 is a diagram of an additional exemplary architecture, according to some embodiments.

FIG. 15 shows an additional exemplary architecture, according to some embodiments. The architecture may include a plurality of realm mobile clients, a load balancer, a plurality of sync servers, a translator, and a realm cluster 470 and a customer cluster 480. In some embodiments, the sync servers may handle connection to devices. In some embodiments, the sync servers may parse, validate, and integrate uploaded changes. In some embodiments, the sync servers may notify devices of new changes. In some embodiments, the sync servers may perform conflict resolution. In some embodiments, the translator may apply mobile writes to MongoDB. In some embodiments, the translator may listen to changes made to MongoDB and insert them into Realm. In some embodiments, the translator may perform Multimaster replication between Realm and MongoDB. In some embodiments, one server in the cluster may be responsible for at least one of these functions of the translator. In some embodiments, the realm cluster 470 may include app information, schema, permissions, and logs. In some embodiments, the customer cluster 480 may include data and sync metadata.

Figure 16:
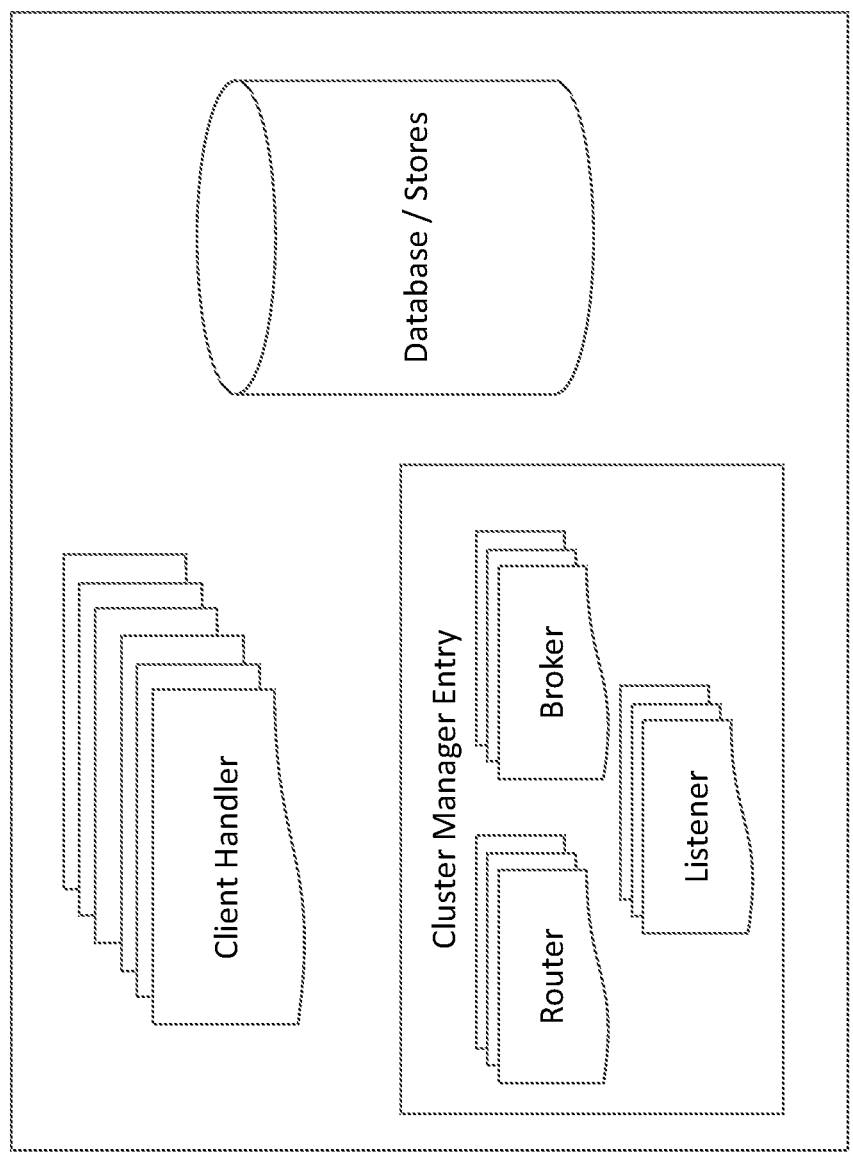
FIG. 16 is a diagram of exemplary bootstrapping architecture, according to some embodiments.

In some embodiments, bootstrapping may be used. For example, bootstrapping is when the client is either connecting for the first time or changing its query. In some embodiments, a "state store" may be kept in the sync metadata, which is a copy of all data that has been uploaded to sync. In some embodiments, a query may be used on all objects that were in the previous query but are no longer in the current query. For example, some embodiments may synthesize EraseObject instructions for those objects. In some embodiments, the new query may be bootstrapped to get any new objects that were previously unseen by the client. FIG. 16 shows exemplary bootstrapping architecture, according to some embodiments.

In some embodiments, uploading may be handled in the following stages: In some embodiments, uploads may be received and validated (e.g., by a ClientHandler). In some embodiments, Operational Transform may be performed against any changes in the server history that are not causally related. In some embodiments, Pre and Post images for each object in the upload may be generated. In some embodiments, the Pre/Post image may be evaluated using the write permissions to ensure write is allowed. In some embodiments, an entry may be inserted into the server history. In some embodiments, the state store documents may be updated. In some embodiments, the progress for the Client File may be updated. In some embodiments, the database transaction may then be committed.

Figure 17:
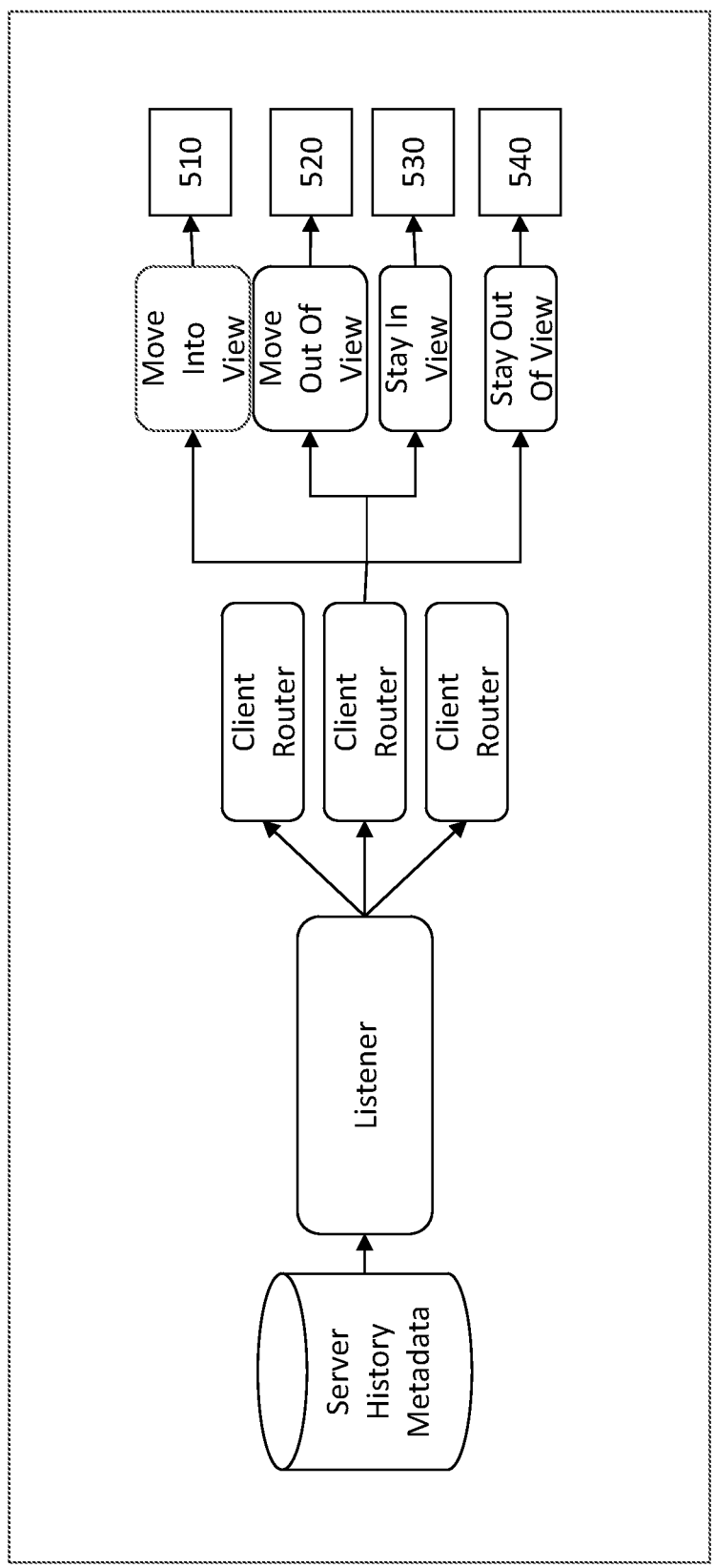
FIG. 17 is a diagram of exemplary steady-state routing architecture, according to some embodiments.

In some embodiments, steady-state routing may be used to provide an efficient way to route new history entries to clients that care about them. In some embodiments, for every entry in history, there is desire to immediately determine if the change is within view of each client's permissions and subscription. For example, an object moving into view depicts why the state store is desirable. For example, there may be a subscription on {price>100}, and bootstrap all objects where price>100. In such an example, change comes in to update {_id: 123, name: "Mac M1", price: 90} to update the price field to 110. For example, the router may only see the single update instruction {id: 123, field: "price", payload: 110}. In some embodiments, there is a need to look up the state of the object in the state store to send the full state of the object. FIG. 17 shows exemplary steady-state routing architecture, according to some embodiments. In some embodiments, the routing architecture may include server history metadata, a listener, a plurality of client routers (such as the routers described herein), and logic 510, 520, 530, and 540. In some embodiments, the listener may open a change stream on the history store to be notified of new additions, and may multiplex the listener events to all clients connected on this server. In some embodiments, all changes in an entry (per-object) may be classified as one of the following using the Pre and Post images. In some embodiments, logic 510 may be caused by an object moving into view and may include getting the object from the state store and sending to the client. In some embodiments, logic 520 may be caused by an object moving out of view and may include synthesizing an EraseObject instruction and sending to the client. In some embodiments, logic 530 may be caused by an object staying in view and may include forwarding instructions to the client. In some embodiments, logic 540 may be caused by an object staying out of view and may include skipping over instructions for the object.

Figure 18:
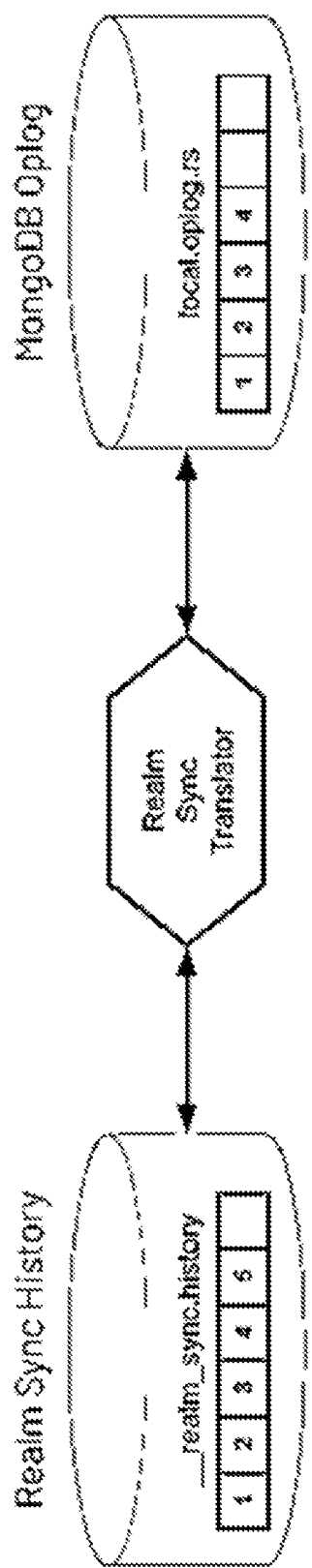
FIG. 18 is a diagram of an exemplary translator architecture, according to some embodiments.

In some embodiments, a translator may be used and in charge of the following three things: Applying changes uploaded to the server to the customer's MongoDB Atlas collections (R2M); Observing changes made to the MongoDB Atlas collections and uploading them to Realm Sync (M2R); and Coordinating these changes in a way that ultimately guarantees consistency between Realm and MongoDB. FIG. 18 shows an exemplary translator architecture, according to some embodiments. In some embodiments, there are 2 main sources of history that the translator has to deal with: Sync History (e.g., we control this collection, when it gets inserted, when it gets pruned) and MongoDB Oplog (e.g., this is how MongoDB replication works; it is implemented as a capped collection (collection with a maximum size), so the earliest entry is constantly being removed).

In some embodiments, a translator may perform the job of the sync client. For example, the translator may integrate changes from the sync server into its own history; the translator may upload its own history to the sync server when possible; changes can be made to the translator's history at any time; conflict resolution needs to take place to resolve the local history with server-side changes. In some embodiments, the translator is essentially a sync client with some caveats, including: talking directly to the sync server in-memory instead of using a websocket.

In some embodiments, a Realm Query Language (RQL) to MongoDB Query Language (MQL) Parser may be used. For IDENT and QUERY messages, the server(s) may accept pure RQL and convert it into a MongoDB query. For example, RQL: "price>10 OR location='nyc'"; MQL: {$or: [{price: {$gt: 10}}, {location: "nyc"}]}. In some embodiments, the query may then be combined with the read permissions to be the "filter" of data that is used for the bootstrap and router. For example, Read Permissions: {user_id: "abc" }; RQL: "price>10"; MQL: {$and: [{user_id: "abc"}, {price: {$gt: 10}}]}.

The inventors have recognized and appreciated that a state store can provide various benefits. For example, bootstrapping from the state store means that we can now "trim" history instead of compacting it. The inventors have recognized that previously, all history needed to be kept forever in order to bootstrap, but in some embodiments very old history need not be kept but can instead be trimmed after a period of time. In some embodiments, bootstrapping from the state store means that corrupted history will no longer cause an infinite loop of client resets. For example, a client could previously get a BAD CHANGESET for something like "Update before a CreateObject." In some embodiments, bootstrapping from the state store may prevent corrupting history and may not cause this infinite loop of issues. In some embodiments, initial syncing (enabling sync for the first time) will no longer saturate history. For example, the initial sync from MongoDB to Realm used to have to upload all changes to Realm, but now, the state store is just seeded with all of the documents and history is "empty" when sync is first enabled.

The inventors have recognized and appreciated that the basic building block of a permission is a "role." In some embodiments, "name" may be useful for debugging and logging information about which role a client is assigned. In some embodiments, "apply_when" may be used at a connection time to determine if a rule should be assigned to a given user. In some embodiments, "write" may be evaluated for each document in an upload to determine if the user has the permissions to modify that document. In some embodiments, "read" may be evaluated for each document to determine if the client should be sent the document. In some embodiments, one caveat is that write permissions imply read permissions. For example, if the write permissions expression evaluates to true, then the client implicitly has read access to the document (even if the read expression evaluates to false).

In some embodiments, assigning permissions may be as follows: if there are table-specific roles, each role may be evaluated in order using the "apply_when," which if evaluated as true means that role is used for the user for the current table and if not, go to the next role in the list and continue; if there are no table-specific roles, do the same steps as above but using the defaultRoles as the list of roles.

In some embodiments, queryable fields may be used. The inventors have recognized and appreciated that exemplary effects of having too many queryable fields include: storage will increase due to storing the Pre image and Post image in each server history entry; thus, the storage will increase more with the number of queryable fields as well as the size of the values of queryable fields (binary blobs, large strings, and lists will have more of a negative performance effect). In some embodiments, the cap on the number of queryable fields may be increased. In some embodiments, the queryable fields input may be made a map so that users can distinguish different fields for different tables. In some embodiments, queryable fields may be automatically inferred while in development mode.

In some embodiments, a translator may use a resume token. In some embodiments, the resume token is a way to mark a location in the MongoDB oplog and resume from that point. In some embodiments, the oplog has a configured size, and so the time range of data in the oplog can become very small if the cluster experiences a high amount of traffic in a short period of time. In some embodiments, if the translator falls a bit behind and the time window for the oplog is small, the resume token we use to mark our location will reference an entry that has been evicted from the oplog. When this happens, reference may be lost to where the Translator is in the oplog, which may mean there is no safe way to resume syncing because trailing changes may not be kept without having to skip over many of them.

In some embodiments, arrays may be supported as queryable fields. In some embodiments, compensating writes may be supported. In some embodiments, auto-adding queryable fields, asymmetric sync, and/or pulling in links may be supported.

Figure 19A:
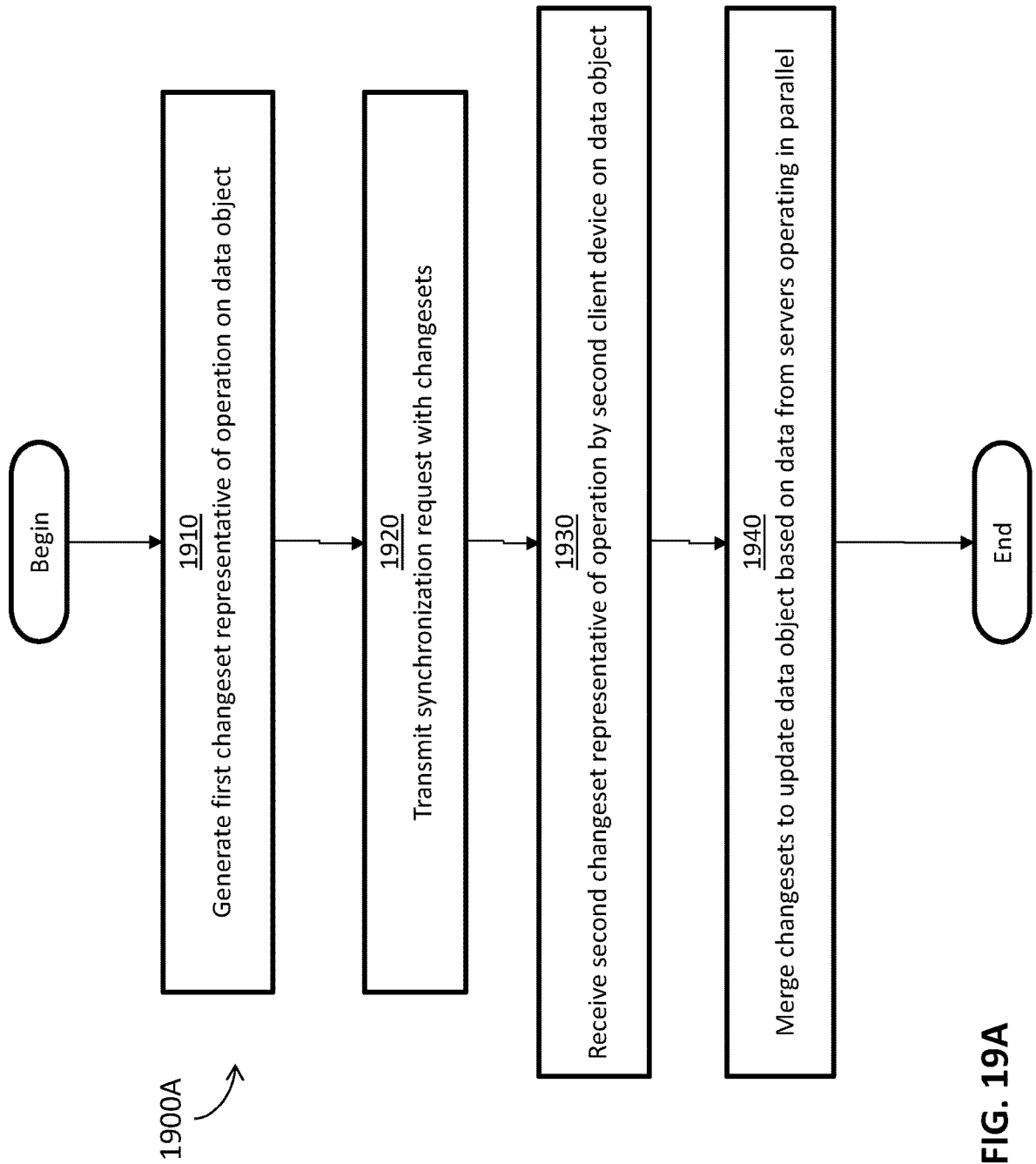
FIG. 19A is a flowchart showing an example method for managing data synchronization for a database, according to some embodiments.

As discussed above, various systems may be configured to manage data synchronization discussed herein. FIG. 19A shows an example process 1900A according to some embodiments. Process 1900A may be performed by a system (e.g., that shown in FIG. 1) to manage data synchronization for a database, such as a database employing a dynamic schema and/or an eventual consistency model. In some embodiments, process 1900A may include an act 1910 of generating (e.g., at a first client device) a first changeset representative of an operation on a data object, which may be performed by a processor.

In some embodiments, process 1900A may further include an act 1920 of transmitting a synchronization request with one or more changesets, which may be performed by a processor, which may be the same as or separate and distinct from the first processor.

In some embodiments, process 1900A may further include an act 1930 of receiving a second changeset representative of an operation by a second client device on the data object, which may be performed by a processor, which may be the same as or separate and distinct from the first processor.

In some embodiments, process 1900A may further include an act 1940 of merging changesets to update the data object based on data from servers operating in parallel, which may be performed by a processor, which may be the same as or separate and distinct from the first processor.

In some embodiments, the acts 1910, 1920, 1930, and/or 1940 may be performed by a client device and/or a server. Dividing the process 1900A between multiple devices may advantageously reduce the total amount of time required to perform the process 1900A by reducing the communication between the client device and the server.

Figure 19B:
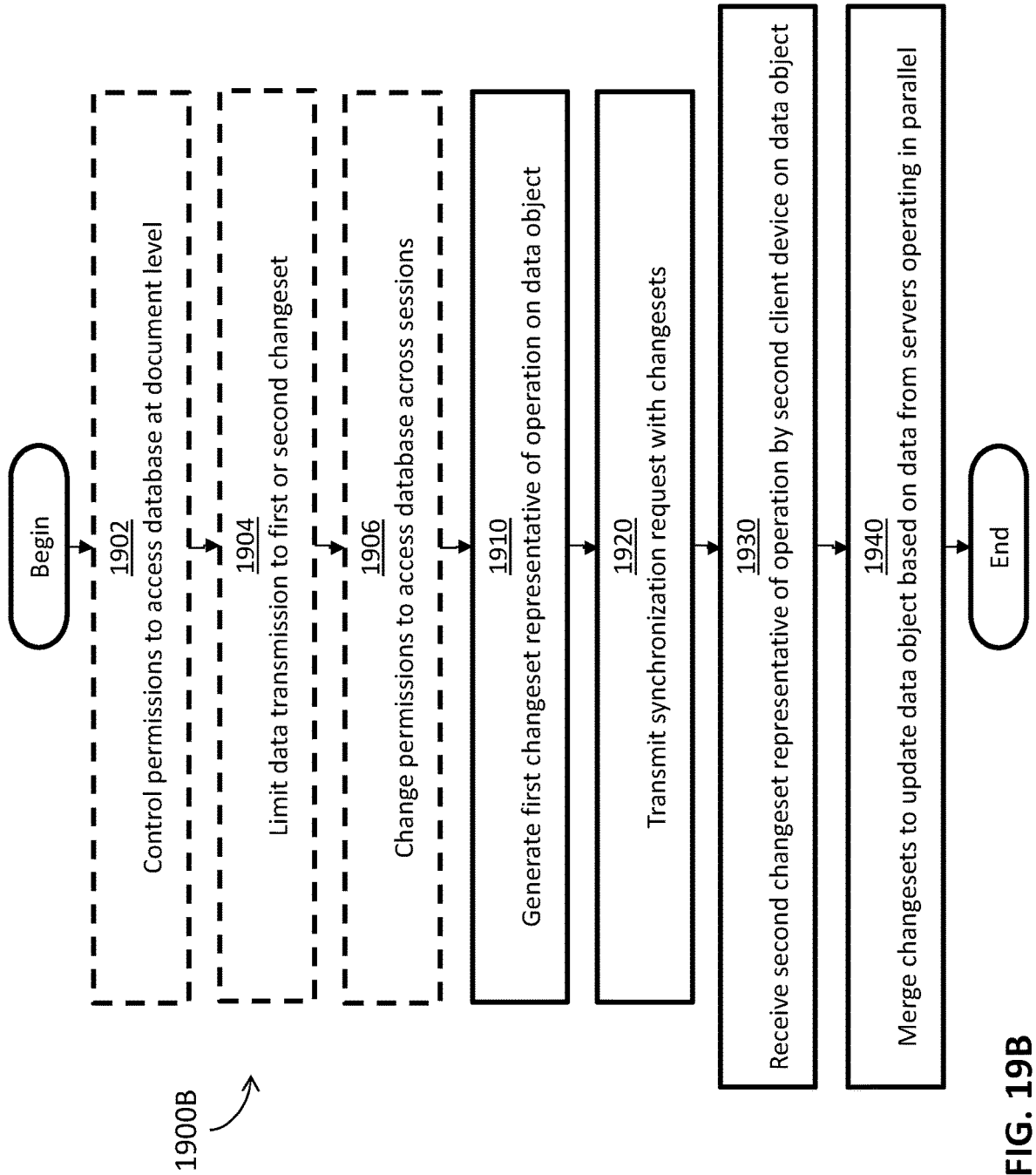
FIG. 19B is a flowchart showing an additional example method for managing data synchronization for a database, according to some embodiments.

FIG. 19B shows an example process 1900B according to some embodiments. Process 1900B may be performed by a system (e.g., that shown in FIG. 1) to manage data synchronization for a database, such as a database employing a dynamic schema and/or an eventual consistency model. In some embodiments, process 1900B may include an act 1902 of controlling permissions to access the database at the document level.

In some embodiments, process 1900B may further include an act 1904 of limiting data transmission (e.g., between a first client device, a second client device, or server(s)) to a first or second changeset.

In some embodiments, process 1900B may further include an act 1906 of changing permissions to access a database across sessions.

In some embodiments, process 1900B may further include an act 1910, similar to that described above. In some embodiments, process 1900B may further include an act 1920 similar to that described above. In some embodiments, process 1900B may further include an act 1930 similar to that described above. In some embodiments, process 1900B may further include an act 1940 similar to that described above.

Process 1900B may then end or repeat as necessary.

Computer System

Figure 2:
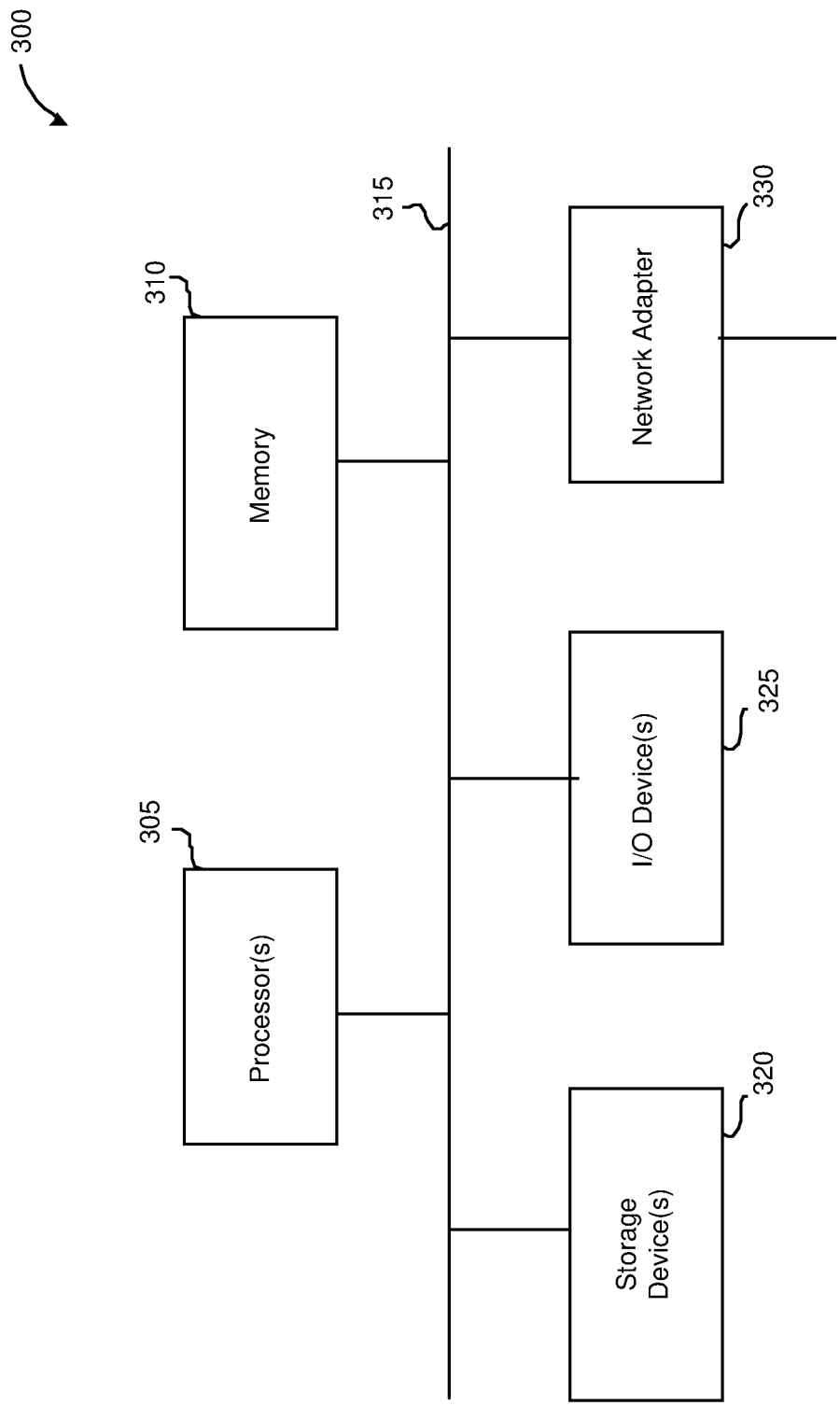
FIG. 2 is an example block diagram of a machine in the example form of a computer system within which a set of instructions for causing the machine to perform one or more of the methodologies discussed herein may be executed, according to some embodiments.

FIG. 2 is a block diagram of a computer system as may be used to implement certain features of some of the embodiments. The computer system may be a server computer, a client computer, a personal computer (PC), a user device, a tablet PC, a laptop computer, a personal digital assistant (PDA), a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, wearable device, or any machine capable of executing a set of instructions (sequential or otherwise) that specify actions to be taken by that machine.

The computing system 300 may include one or more central processing units ("processors") 305, memory 310, input/output devices 325, e.g., keyboard and pointing devices, touch devices, display devices, storage devices 320, e.g., disk drives, and network adapters 330, e.g., network interfaces, that are connected to an interconnect 315. The interconnect 315 is illustrated as an abstraction that represents any one or more separate physical buses, point to point connections, or both connected by appropriate bridges, adapters, or controllers. The interconnect 315, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (12C) bus, or an Institute of Electrical and Electronics Engineers (IEEE) standard 1394 bus, also called Firewire.

The memory 310 and storage devices 320 arc computer-readable storage media that may store instructions that implement at least portions of the various embodiments. In addition, the data structures and message structures may be stored or transmitted via a data transmission medium, e.g., a signal on a communications link. Various communications links may be used, e.g., the Internet, a local area network, a wide area network, or a point-to-point dial-up connection. Thus, computer readable media can include computer-readable storage media, e.g., non-transitory media, and computer-readable transmission media.

The instructions stored in memory 310 can be implemented as software and/or firmware to program the processor 305 to carry out actions described above. In some embodiments, such software or firmware may be initially provided to the processing system 300 by downloading it from a remote system through the computing system 300, e.g., via network adapter 330.

The various embodiments introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

The terms "program" or "software" are used herein in a generic sense to refer to any type of computer code or set of processor-executable instructions that can be employed to program a computer or other processor to implement various aspects of embodiments as discussed above. Additionally, it should be appreciated that according to one aspect, one or more computer programs that when executed perform methods of the disclosure provided herein need not reside on a single computer or processor, but may be distributed in a modular fashion among different computers or processors to implement various aspects of the disclosure provided herein.

Processor-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in one or more non-transitory computer-readable storage media in any suitable form. For simplicity of illustration, data structures may be shown to have fields that are related through location in the data structure. Such relationships may likewise be achieved by assigning storage for the fields with locations in a non-transitory computer-readable medium that convey relationship between the fields. However, any suitable mechanism may be used to establish relationships among information in fields of a data structure, including through the use of pointers, tags or other mechanisms that establish relationships among data elements.

Also, various inventive concepts may be embodied as one or more processes, of which examples (e.g., the processes described with reference to figures and functions above, the various system components, analysis algorithms, processing algorithms, etc.) have been provided. The acts performed as part of each process may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, and/or ordinary meanings of the defined terms. As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing," "involving," and variations thereof, is meant to encompass the items listed thereafter and additional items.

Having described several embodiments of the techniques described herein in detail, various modifications, and improvements will readily occur to those skilled in the art. Such modifications and improvements are intended to be within the spirit and scope of the disclosure. Accordingly, the foregoing description is by way of example only, and is not intended as limiting. The techniques are limited only as defined by the following claims and the equivalents thereto.

What is claimed is:

1. A database system comprising:
   a database having a dynamic schema; and
   at least one processor configured to:
      generate, at a first client device, a first changeset that is representative of an operation on a data object in a database;
      transmit, from the first client device and to one or more servers, a synchronization request for synchronizing the database with one or more changesets generated by a second client device;
      receive, at the first client device and from the one or more servers in response to the synchronization request, a second changeset that is representative of an operation performed by the second client device on the data object, wherein the database is shared between the first client device and the second client device; and merge, at the first client device, the first changeset and the second changeset to update the data object, wherein the merging is performed based on data received from a plurality of the one or more servers operating in parallel to each other, the merging comprising:

determining a type of operation to which the first changeset corresponds and a type of operation to which the second changeset corresponds;

responsive to determining that at least one of the first changeset or the second changeset corresponds to a first type of operation, applying one of the first changeset or the second changeset based on a comparison of a first timestamp associated with the first changeset and a second timestamp associated with the second changeset; and responsive to determining that at least one of the first changeset or the second changeset correspond to a second type of operation, applying one of the first changeset or the second changeset irrespective of the first timestamp associated with the first changeset and the second timestamp associated with the second changeset.

2. The database system of claim 1, wherein permissions to access the database are controlled at a document level.

3. The database system of claim 2, wherein the permissions are controlled at a field level.

4. The database system of claim 1, wherein data transmitted between the first client device, the second client device, or the one or more servers is limited to the first changeset or the second changeset.

5. The database system of claim 1, wherein permissions to access the database change across sessions.

6. The database system of claim 1, wherein data to be synchronized via the synchronization request is decided via a language-native query.

7. The database system of claim 6, wherein the language-native query is processed on the one or more servers.

8. The database system of claim 6, wherein the language-native query is in a first query language of the first client device or the second client device and is translated to a second query language of the one or more servers.

9. The database system of claim 8, wherein permissions to access the translated query are added.

10. The database system of claim 9, wherein a filtered set of data is identified for synchronization based on execution of the translated and permissioned query.

11. The database system of claim 1, wherein needed data is identified by the one or more servers based on at least one changeset to be processed on the first client device or the second client device.

12. The database system of claim 1, wherein the at least one processor is further configured to:
update at least one query.

13. The database system of claim 1, wherein the at least one processor is further configured to:
coordinate the synchronizing of the database with an application on the first client device or the second client device.

14. A computer implemented method comprising:
generating, at a first client device, a first changeset that is representative of an operation on a data object in a database;

transmitting, from the first client device and to one or more servers, a synchronization request for synchronizing the database with one or more changesets generated by a second client device;

receiving, at the first client device and from the one or more servers in response to the synchronization request, a second changeset that is representative of an operation performed by the second client device on the data object, wherein the database is shared between the first client device and the second client device; and merging, at the first client device, the first changeset and the second changeset to update the data object, wherein the merging is performed based on data received from a plurality of the one or more servers operating in parallel to each other, the merging comprising:

determining a type of operation to which the first changeset corresponds and a type of operation to which the second changeset corresponds;

responsive to determining that at least one of the first changeset or the second changeset corresponds to a first type of operation, applying one of the first changeset or the second changeset based on a comparison of a first timestamp associated with the first changeset and a second timestamp associated with the second changeset; and responsive to determining that at least one of the first changeset or the second changeset correspond to a second type of operation, applying one of the first changeset or the second changeset irrespective of the first timestamp associated with the first changeset and the second timestamp associated with the second changeset.

15. The method of claim 14, wherein data transmitted between the first client device, the second client device, or the one or more servers is limited to the first changeset or the second changeset.

16. The method of claim 14, wherein permissions to access the database change across sessions.

17. At least one computer-readable storage medium having instructions recorded thereon which, when executed by a computer, cause the computer to perform a method for managing data synchronization for a database having a dynamic schema, the method comprising:

generating, at a first client device, a first changeset that is representative of an operation on a data object in a database;

transmitting, from the first client device and to one or more servers, a synchronization request for synchronizing the database with one or more changesets generated by a second client device;

receiving, at the first client device and from the one or more servers in response to the synchronization request, a second changeset that is representative of an operation performed by the second client device on the data object, wherein the database is shared between the first client device and the second client device; and merging, at the first client device, the first changeset and the second changeset to update the data object, wherein the merging is performed based on data received from a plurality of the one or more servers operating in parallel to each other, the merging comprising:

determining a type of operation to which the first changeset corresponds and a type of operation to which the second changeset corresponds;

responsive to determining that at least one of the first changeset or the second changeset corresponds to a first type of operation, applying one of the first changeset or the second changeset based on a comparison of a first timestamp associated with the first changeset and a second timestamp associated with the second changeset; and responsive to determining that at least one of the first changeset or the second changeset correspond to a second type of operation, applying one of the first changeset or the second changeset irrespective of the first timestamp associated with the first changeset and the second timestamp associated with the second changeset.

18. The at least one computer-readable storage medium of claim 17, wherein data transmitted between the first client device, the second client device, or the one or more servers is limited to the first changeset or the second changeset.

19. The at least one computer-readable storage medium of claim 17, wherein permissions to access the database change across sessions.

20. A computer implemented method comprising:
accessing, at a first client device, a first changeset that is representative of an operation performed on a data object in a database by the first client device;
transmitting, from the first client device and to one or more servers, a synchronization request for synchronizing the database with one or more changesets generated by a second client device;
receiving, at the first client device and from the one or more servers in response to the synchronization request, a second changeset that is representative of an operation performed by the second client device on the data object, wherein the data object is shared between the first client device and the second client device; and
merging, at the first client device, the first changeset and the second changeset to update the data object, wherein the merging is performed based on one or more rules that are specific to a type of the operation in the first changeset and the second changeset, the merging comprising:
determining a type of operation to which the first changeset corresponds and a type of operation to which the second changeset corresponds;
responsive to determining that at least one of the first changeset or the second changeset corresponds to a first type of operation, applying one of the first changeset or the second changeset based on a comparison of a first timestamp associated with the first changeset and a second timestamp associated with the second changeset; and
responsive to determining that at least one of the first changeset or the second changeset corresponds to a second type of operation, applying one of the first changeset or the second changeset irrespective of the first timestamp associated with the first changeset and the second timestamp associated with the second changeset.

* * * * *